(12) United States Patent
Kuriyagawa et al.

(10) Patent No.: US 9,205,907 B2
(45) Date of Patent: Dec. 8, 2015

(54) OUTBOARD MOTOR AND CONTROL APPARATUS THEREOF

(71) Applicant: HONDA MOTOR CO., LTD., Minato-Ku, Tokyo (JP)

(72) Inventors: Koji Kuriyagawa, Wako (JP); Yoshiyuki Matsuda, Wako (JP); Hajime Yoshimura, Wako (JP); Nobuchika Katagiri, Wako (JP); Masahide Shinokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 13/961,946

(22) Filed: Aug. 8, 2013

(65) Prior Publication Data

US 2014/0045393 A1 Feb. 13, 2014

(30) Foreign Application Priority Data

| Aug. 13, 2012 | (JP) | 2012-179339 |
| Aug. 13, 2012 | (JP) | 2012-179340 |
| Aug. 21, 2012 | (JP) | 2012-182231 |

(51) Int. Cl.
| *B63H 20/20* | (2006.01) |
| *B63H 20/14* | (2006.01) |
| *B63H 20/00* | (2006.01) |
| *F16H 61/00* | (2006.01) |
| *F16H 61/02* | (2006.01) |
| *F16H 61/30* | (2006.01) |
| *F16H 61/04* | (2006.01) |

(52) U.S. Cl.
CPC .............. *B63H 20/20* (2013.01); *B63H 20/002* (2013.01); *B63H 20/14* (2013.01); *F16H 61/0021* (2013.01); *F16H 61/0206* (2013.01); *F16H 61/04* (2013.01); *F16H 61/30* (2013.01); *F16H 2061/0474* (2013.01)

(58) Field of Classification Search
CPC ......... B63H 23/30; B63H 21/28; B63H 20/14
See application file for complete search history.

(56) References Cited

U.S. PATENT DOCUMENTS

2009/0247026 A1* 10/2009 Suzuki et al. .................. 440/1
2011/0143612 A1* 6/2011 Kuriyagawa et al. ........... 440/86

FOREIGN PATENT DOCUMENTS

JP    H10-278890 A    10/1998

* cited by examiner

*Primary Examiner* — Edwin Swinehart
(74) *Attorney, Agent, or Firm* — Carrier Blackman & Associates, P.C.; Joseph P. Carrier; Jeffrey T. Gedeon

(57) ABSTRACT

An outboard motor mounted on a stern of a boat is provided with a transmission and an oil pump. The transmission has a first-speed and second-speed gears, a first-speed gear clutch made of a mechanical dog clutch and a second-speed gear clutch made of a hydraulic clutch each adapted to engage the first and second-speed gears on a power transmission shaft, and a first-speed gear shift actuator adapted to couple the first-speed gear clutch with the first-speed gear. In the transmission, a first speed is established when the first-speed gear is engaged on the power transmission shaft and a second speed is established when the second-speed gear is engaged on the power transmission shaft while the first speed has been established such that power of the engine is transmitted to the propeller through the established speed.

12 Claims, 15 Drawing Sheets

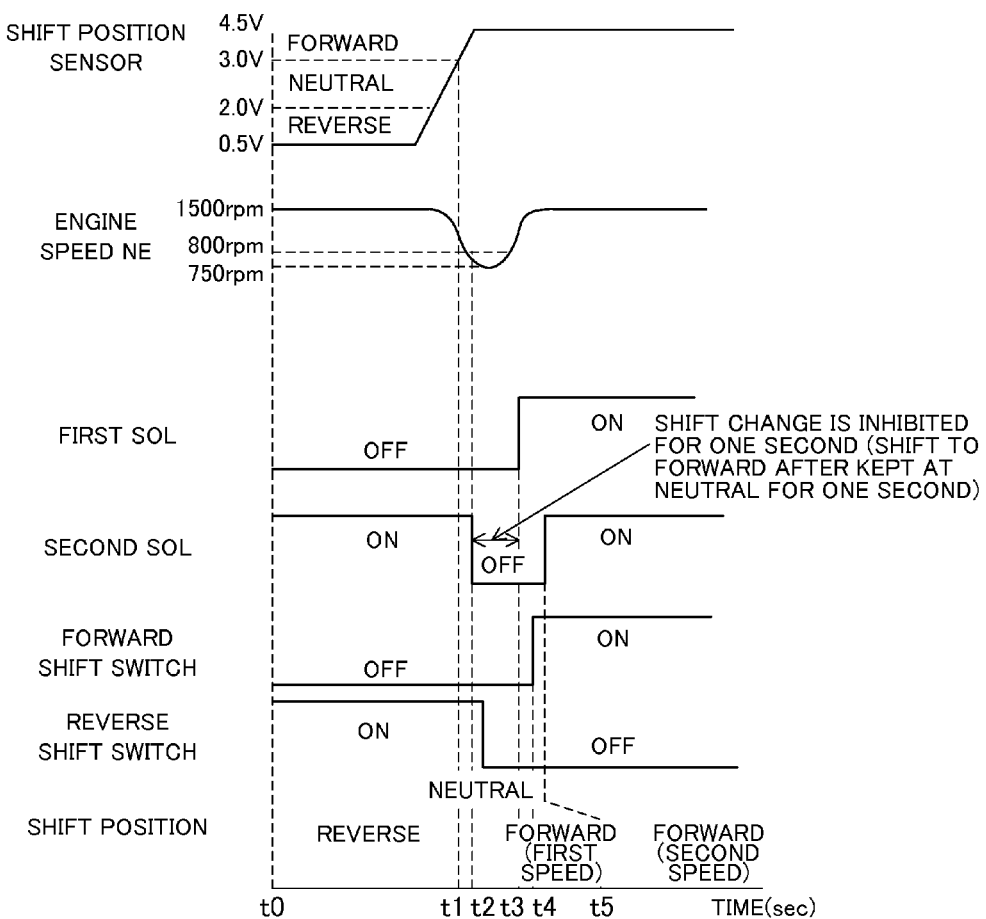

OUTBOARD MOTOR AND CONTROL APPARATUS THEREOF

BACKGROUND

1. Technical Field

Embodiment of the invention relate to an outboard motor and a control apparatus thereof, particularly to an outboard motor and a control apparatus of an outboard motor that has a transmission.

2. Background Art

In recent years, in an outboard or inboard motor having a transmission interposed at a power transmission shaft connecting an internal combustion engine to a propeller to transmit an output of the engine to the propeller, there is proposed a technique to reduce a gear tooth hammering noise (rattling sound) caused, for example, by a phase error (shift) between the engine rotation relative and the propeller rotation, as taught, by Japanese Laid-Open Patent Application No. Hei 10 (1998)-278890.

The technique mentioned in the reference is configured to reduce or eliminate the gear tooth hammering noise due to the phase error between the engine rotation and the propeller rotation by controlling a slippage of a hydraulic clutch in response to the engine load.

SUMMARY

Aside from the phase error between the engine rotation and the propeller rotation as mentioned above, the gear tooth hammering noise may sometimes be caused by a half-engaged state of a transmission hydraulic clutch at an initial stage after shifting due to insufficient hydraulic oil (pressure) supplied thereto.

In order to suppress the tooth hammering noise, especially in an outboard or inboard motor installed with a transmission having a plurality of gears such as the first and second gears, the outboard motor must have a large-capacity hydraulic pump of a large size to supply a hydraulic oil to the hydraulic clutch at shifting sufficiently. However, this requires a larger space for accommodating the pump and increases the motor weight and cost.

An object of embodiment of the invention is therefore to overcome the foregoing drawback by providing an outboard motor having a transmission and a control apparatus thereof that enables to supply a hydraulic oil to a hydraulic clutch sufficiently so as not to cause the tooth hammering noise, without increasing the pump capacity.

In order to achieve the object, this invention provides in a first aspect an outboard motor adapted to be mounted on a stern of a hull of a boat and installed with an internal combustion engine to power a propeller through a power transmission shaft, comprising: a transmission having at least a first-speed gear and a second-speed gear each supported on the power transmission shaft, a first-speed gear clutch that is made of a mechanical dog clutch and is adapted to engage the first-speed gear on the power transmission shaft, a second-speed gear clutch that is made of a hydraulic clutch and is adapted to engage the second-speed gear on the power transmission shaft, and a first-speed gear shift actuator that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed; an hydraulic oil pump that discharges a pressurized hydraulic oil when driven by the engine; a first electromagnetic solenoid valve provided at an oil passage connecting the pump and the first-speed gear shift actuator; and a second electromagnetic solenoid valve provided at an oil passage connecting the pump and the second-speed gear clutch.

In order to achieve the object, this invention provides in a first aspect an apparatus for controlling operation of an outboard motor adapted to be mounted on a stern of a hull of a boat and installed with an internal combustion engine to power a propeller through a power transmission shaft, comprising: a transmission having at least a first-speed gear and a second-speed gear each supported on the power transmission shaft, a first-speed gear clutch that is made of a mechanical dog clutch and is adapted to engage the first-speed gear on the power transmission shaft, a second-speed gear clutch that is made of a hydraulic clutch and is adapted to engage the second-speed gear on the power transmission shaft, and a first-speed gear shift actuator that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed; an hydraulic oil pump that discharges a pressurized hydraulic oil when driven by the engine; a first electromagnetic solenoid valve provided at an oil passage connecting the pump and the first-speed gear shift actuator; a second electromagnetic solenoid valve provided at an oil passage connecting the pump and the second-speed gear clutch; a shift/throttle lever position detector that detects whether a position of a shift/throttle lever manually operable by an operator is changed from neutral to forward; and a controller that controls operation of the first and second electromagnetic solenoid valves in such a manner that the first-speed gear clutch is coupled with the first-speed gear to establish the first speed and then the established first speed is shifted to the second speed, when the shift/throttle lever position is detected to be changed from the neutral to the forward.

BRIEF DESCRIPTION OF THE DRAWINGS

The above and other objects and advantages of embodiments of the invention will be more apparent from the following description and drawings in which:

FIGS. 8A-8B is a set of explanatory view of a third switch valve shown in the hydraulic circuit diagram of FIG. 4, in which FIG. 8A shows an initial state in which s spool of the third switch valve is urged toward the one end by a spring, and FIG. 8B shows an operation state in which the spool is urged toward the other end by the hydraulic oil;

FIG. 15 is a time chart similarly explaining the processing of the flowchart of FIG. 13.

DESCRIPTION OF EMBODIMENT

Embodiment of an outboard motor and a control apparatus thereof according to the invention will now be explained with reference to the attached drawings.

Figure 1:
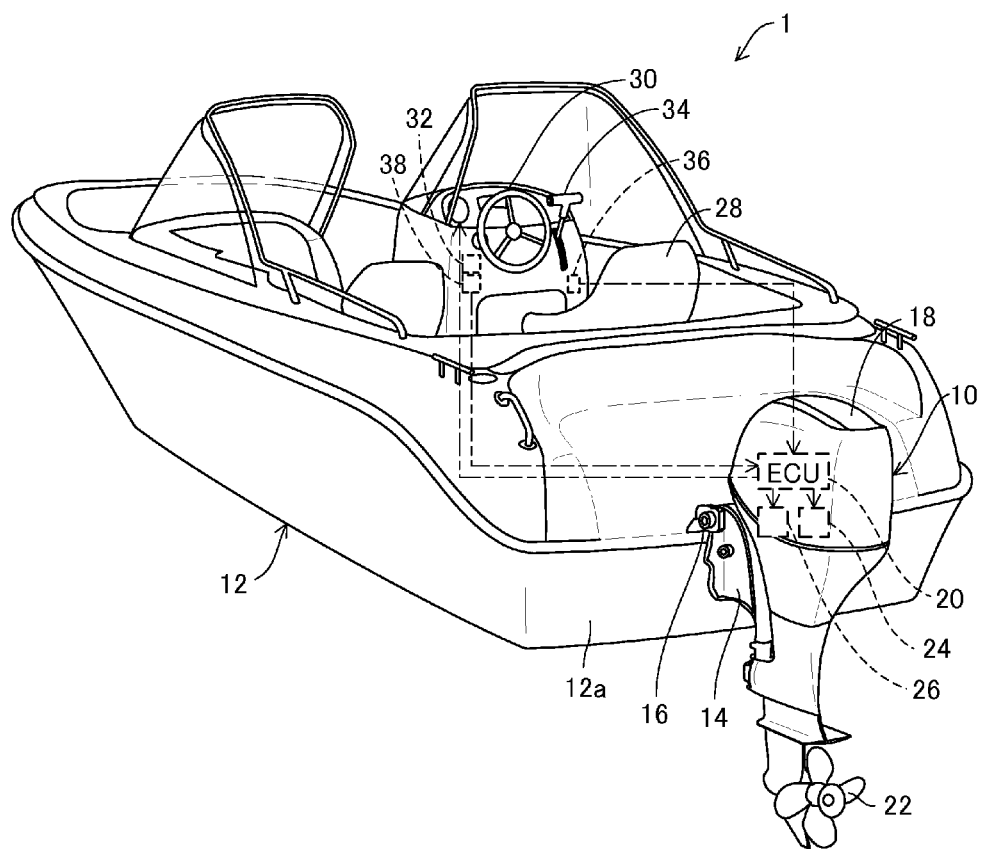
FIG. 1 is an overall schematic view of an outboard motor including a boat (hull) according to an embodiment of the invention.

FIG. 1 is an overall schematic view of an outboard motor including a boat (hull) according to the embodiment of the invention.

In FIG. 1, symbol 1 indicates a boat or vessel whose hull 12 is mounted with an outboard motor 10. As illustrated, the outboard motor 10 is clamped (fastened) to the stern or transom 12a of the hull 12, through stern brackets 14 and a tilting shaft 16.

The outboard motor 10 has an internal combustion engine (prime mover; not shown in FIG. 1) and an engine cover 18 that covers the engine. The engine cover 18 accommodates, in addition to the engine, in its interior space (engine room) an Electronic Control Unit (ECU) 20. The ECU 20 has a microcomputer constituted by a CPU, ROM, RAM and other devices, and functions as an outboard control apparatus for controlling the operation of the outboard motor 10.

The outboard motor 10 is provided with a transmission (automatic transmission) 24 that is interposed between a drive shaft for transmitting the engine power to a propeller 22 and a power tilt/trim unit (hereinafter referred to as "trim unit") 26. The transmission 24 has a plurality of gears including the first-speed gear and the second-speed gear and transmits the engine power through the selected gear to the propeller 22. The trim unit 26 is adapted to regulate a tilt/trim angle of the outboard motor 10 relative to the hull 12 by tilting up/down or trimming up/down. The operation of the transmission 24 and trim unit 26 is controlled by the ECU 20.

A steering wheel 30 is installed near a cockpit (operator's seat) 28 of the hull 12 to be rotatably manipulated by the operator. A steering angle sensor 32 is attached on a shaft (not shown) of the steering wheel 30 and produces an output or signal corresponding to the steering angle applied or inputted by the operator through the steering wheel 30.

A shift/throttle lever (shift lever) 34 is provided near the cockpit 28 to be manipulated by the operator. The shift/throttle lever 34 can be moved or swung in the front-back direction from the initial position and is used by the operator to input a shift command (switch command among forward, reverse and neutral) and an engine speed command. A lever position sensor (shift/throttle lever position sensor) 36 is installed near the shift/throttle lever 34 and produces an output or signal corresponding to a position of the shift/throttle lever 34.

A GPS receiver 38 is provided at an appropriate location of the hull 12 to receive a Global Positioning System signal and produces an output or signal indicative of the positional information of the boat 1 obtained from the GPS signal. The outputs of the steering angle sensor 32, lever position sensor 36 and GPS receiver 38 are sent to the ECU 20.

Figure 2:
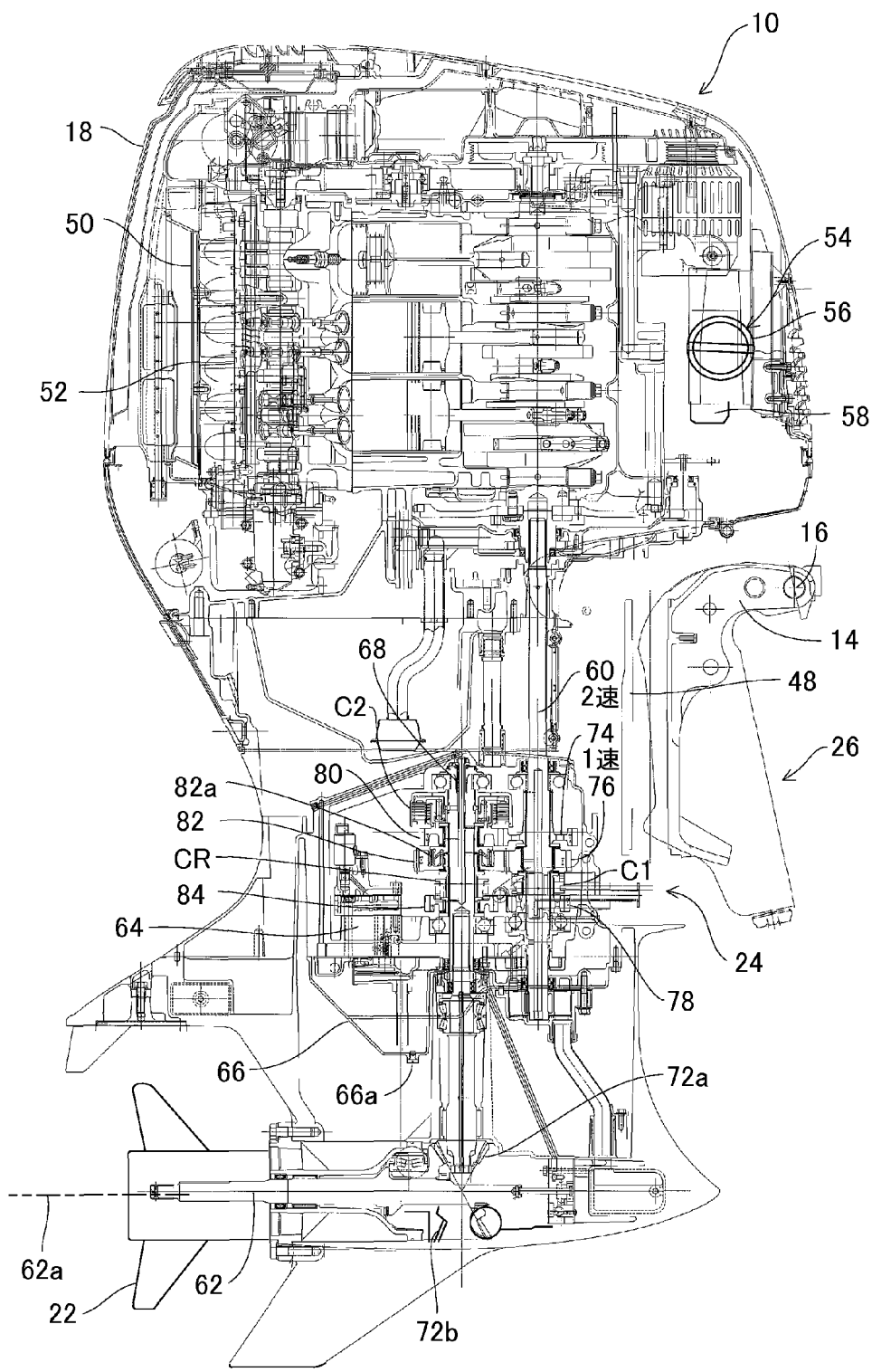
FIG. 2 is an enlarged sectional side view showing the outboard motor shown in FIG. 1.
Figure 3:
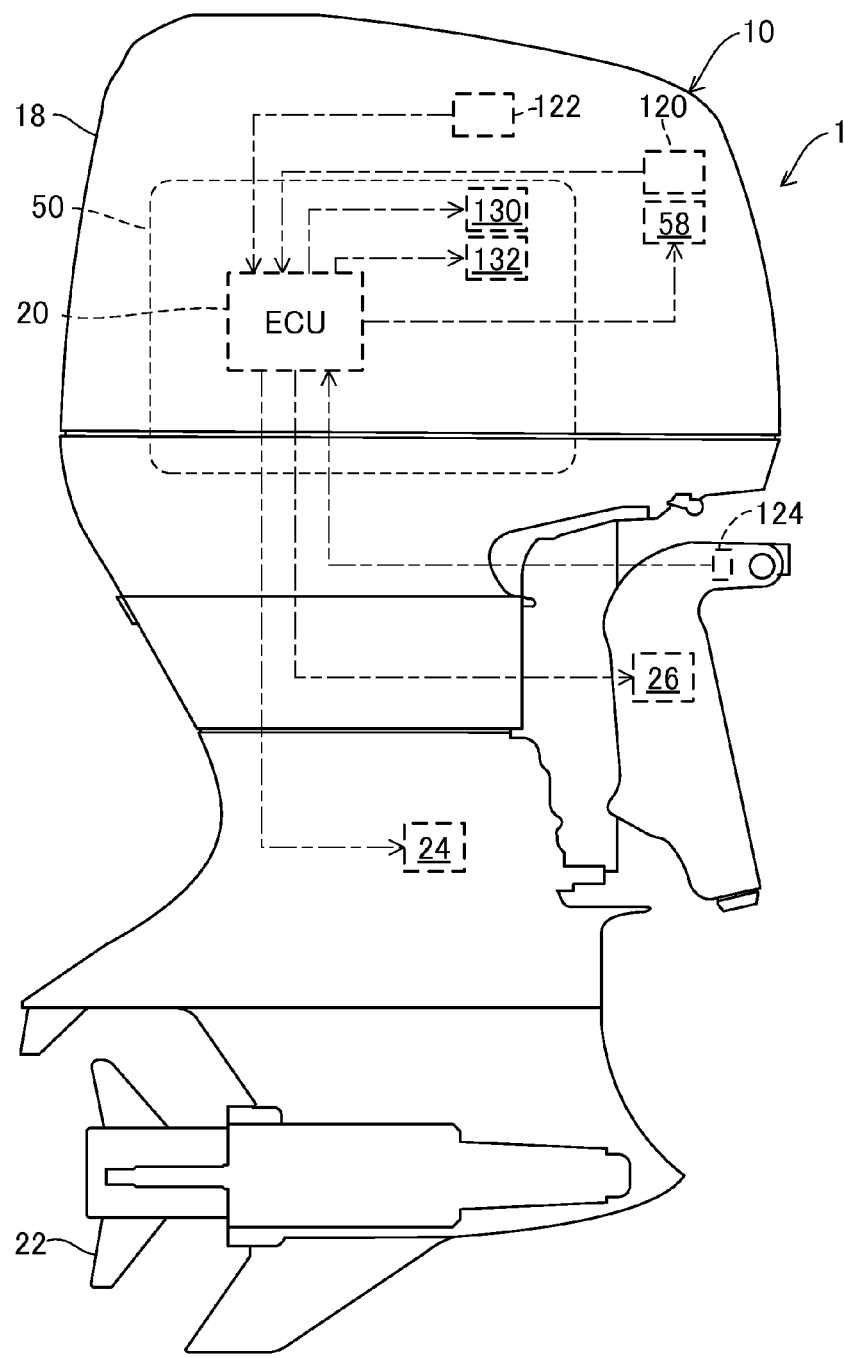
FIG. 3 is an enlarged side view of the outboard motor shown in FIG. 1.
Figure 4:
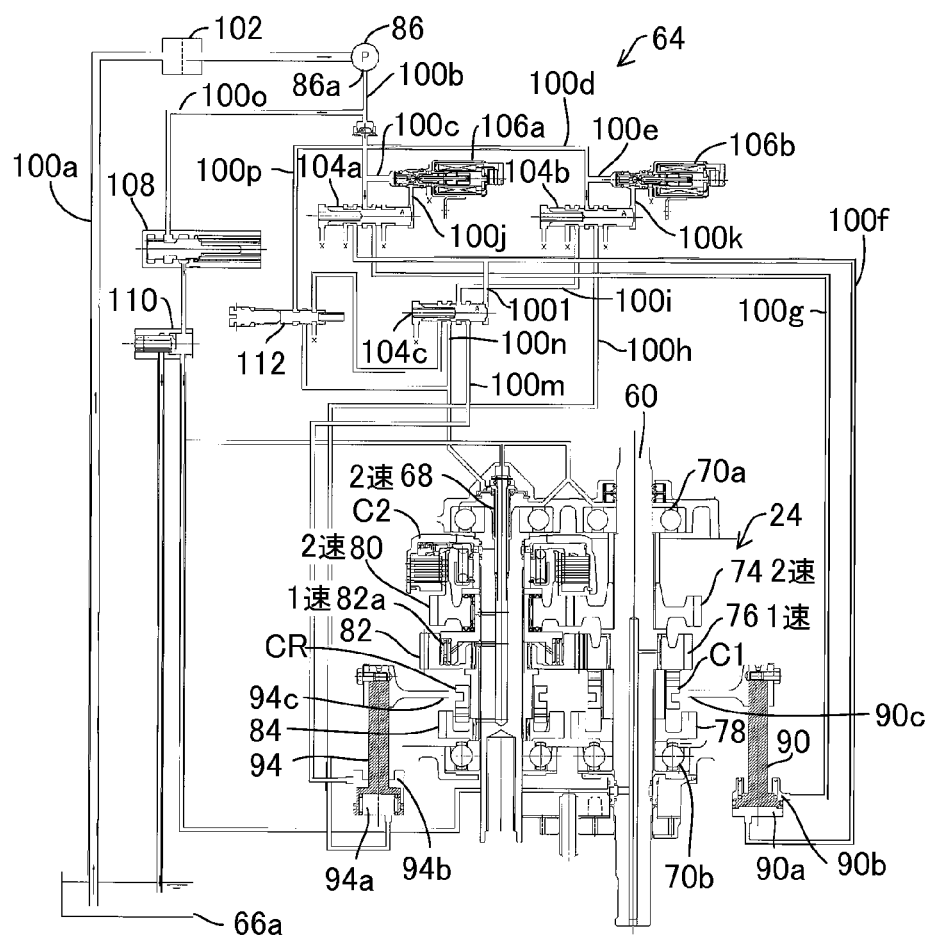
FIG. 4 is a hydraulic circuit diagram schematically showing a hydraulic circuit of a transmission mechanism shown in FIG. 2.

FIG. 2 is an enlarged sectional side view partially showing the outboard motor shown in FIG. 1, FIG. 3 is an enlarged side view of the outboard motor shown in FIG. 1, and FIG. 4 is a hydraulic circuit diagram schematically showing a hydraulic circuit of the transmission 24.

As shown in FIG. 2, the outboard motor 10 is clamped to the stern 12a of the hull 12, through the stern brackets 14, the tilting shaft 16 and a swivel case 48. The trim unit is provided at a location close to the swivel case 48 and stern brackets 14.

The trim unit 26 has a hydraulic cylinder for tilt angle regulation, a hydraulic cylinder for trim angle regulation and electric motors each connected to the hydraulic cylinders through a hydraulic circuit (neither shown). In the trim unit 26, the electric motors are driven by a tilt up/down signal or a trim up/down signal sent from the ECU 20 to supply a hydraulic oil (pressure) to the cylinder concerned so as to extend/contract the same.

With this, the swivel case 48 is rotated about the tilting shaft 16 so that the outboard motor 10 is tilt up/down (and trim up/down) relative to the hull 12. The electric motors in the trim unit 26 are duty-ratio controlled (Pulse Width Modulation control) and a change amount of trim angle in trim up/down, i.e., the trim speed is stepwise or continuously changed.

The outboard motor 10 is installed at its upper portion with the aforesaid engine (now assigned by symbol 50). The engine 50 comprises a spark-ignition, water-cooled, gasoline engine with a displacement of 2,200 cc. The engine 50 is located above the water surface, and is covered by the engine cover 18.

An air intake pipe 52 of the engine 50 is connected to a throttle body 54. The throttle body 54 has a throttle valve 56 installed therein and an electric throttle motor 58 for opening and closing the throttle valve 56 is integrally disposed thereto. The output shaft of the throttle motor 58 is connected to the throttle valve 56 via a speed reduction gear mechanism (not shown). The throttle motor 58 is operated to open and close the throttle valve 56, thereby regulating a flow rate of air sucked into the engine 50 to control the engine speed.

The outboard motor 10 is provided with a main shaft (input shaft; corresponding to the aforesaid drive shaft) 60 that is rotatably supported in parallel with a vertical axis and its upper end is connected to the crankshaft (not shown) of the engine 50, while its lower end is connected to a propeller shaft (the aforesaid drive shaft) 62 that is rotatably supported in parallel with a horizontal axis.

The aforesaid transmission 24 having the first-speed and second-speed forward gears and the reverse gear is provided at a location between the main shaft 60 and the propeller shaft 62. The power of the engine 50 is transmitted to the propeller 22 through the main shaft 60, transmission 24 and the propeller shaft 62.

The propeller shaft 62 is fixed to the outboard motor 10 in such a manner that its axis 62a is substantially parallel to the forward direction of the boat 1 when the trim unit 26 is at its initial state, i.e., the trim angle is the initial angle (zero degree).

At a rear position of the transmission 24 in the forward moving direction of the hull 12 (left of the transmission 24 in FIG. 2), there is provided a valve unit 64 comprising a plurality of hydraulic valves to be used for controlling the transmission 24. The valve unit 64 and a part of the main shaft 60 is contained in a case 66, and the lower portion of the case 66 functions as an oil pan (reservoir) 66a.

As shown in FIGS. 2 and 4, the transmission 24 is constituted as a parallel-axis type transmission comprising the aforesaid main shaft (input shaft) 60, a countershaft (output shaft) 68 disposed in parallel with the main shaft 60 and connected thereto through a plurality of gears. The main shaft 60 and countershaft 68 are each supported in the case 66 through a pair of bearings 70a, 70b. The countershaft 68 is connected (coupled) to the propeller shaft 62 at its distal end (the lower end in FIG. 2) through a pinion gear 72a and a bevel gear 72b.

The main shaft 60 is provided (from the top in FIG. 2) with a main second-speed gear 74 irrotatably supported thereon, a main first-speed gear 76 rotatably supported thereon, a first-speed gear clutch (made of a mechanical dog clutch) C1 irrotatably but longitudinally movably supported thereon and a main reverse gear 78 irrotatably supported thereon, while the countershaft 68 is provided with a second-speed gear clutch (made of a hydraulic clutch) C2 irrotatably but longitudinally movably supported thereon, a counter second-speed gear 80 rotatably supported thereon and meshed with the main second-speed gear 74, a counter first-speed gear 82 irrotatably supported thereon and meshed with the main first-speed gear 76, a reverse clutch (mechanical dog clutch) CR irrotatably but longitudinally movably supported thereon and a counter reverse gear 84 rotatably supported thereto and meshed with the main reverse gear 78.

When the first-speed gear clutch C1 is moved in one longitudinal direction, i.e., in the upper direction, for a predetermined distance, it coupled with the main first-speed gear 76 and engages (fastens) the gear 76 on the main shaft 60 to establish the first speed.

The second-speed gear clutch C2 is supplied with the hydraulic oil (pressure) from a hydraulic oil pump 86 (driven by the engine 50) engages (fastens) the counter second-speed gear 80 on the countershaft 68 to establish the second speed.

When the reverse gear clutch CR is moved in one longitudinal direction, i.e., in the lower direction, for a predetermined distance, it coupled with the counter reverse gear 84 and engages (fastens) the counter reverse gear 84 on the countershaft to establish the reverse.

The counter first-speed gear 82 is installed with one-way clutch 82a that releases (decouples) the counter first-speed gear 82 from the countershaft 68 when the rotational speed of the main shaft 60 becomes greater than a predetermined rotational speed while the main first-speed gear 76 has been engaged with the main shaft 60. In other words, while the rotational speed of the main shaft 60 is relatively low, the power of the engine 50 is transmitted to the propeller 22 by the main first-speed gear 76 and countershaft 68, but when the rotational speed of the main shaft 60 increases, the engagement of the gear 76 and shaft 68 is released.

As shown in FIG. 4, the first-speed gear clutch C1 is connected to a first-speed gear shift actuator 90 through a shift fork 90c. The first-speed gear shift actuator 90 is a hydraulic actuator that can extend or contract and when it extends, it moves the first-speed gear clutch C1 in a longitudinal direction of the main shaft 60, while when it contracts, it move the clutch C1 in a direction opposite thereto.

Specifically, when the actuator 90 is supplied with the hydraulic oil in its oil chamber (for extension) 90a, it extends and moves the shift fork 90c and the clutch C1 upwardly (in the figure). Moving for a predetermined distance, the clutch C1 is coupled with the main first-speed gear 76. On the other hand, when the actuator 90 is supplied with hydraulic oil in its oil chamber (for contraction) 90b, it contracts and moves downwardly to a neutral position where the clutch C1 is coupled with no gears.

When the first-speed gear clutch C1 is coupled with the main first-speed gear 76, since the gear 76 is engaged on the main shaft 60, the gear 76 rotates with the main shaft 60.

Figure 5:
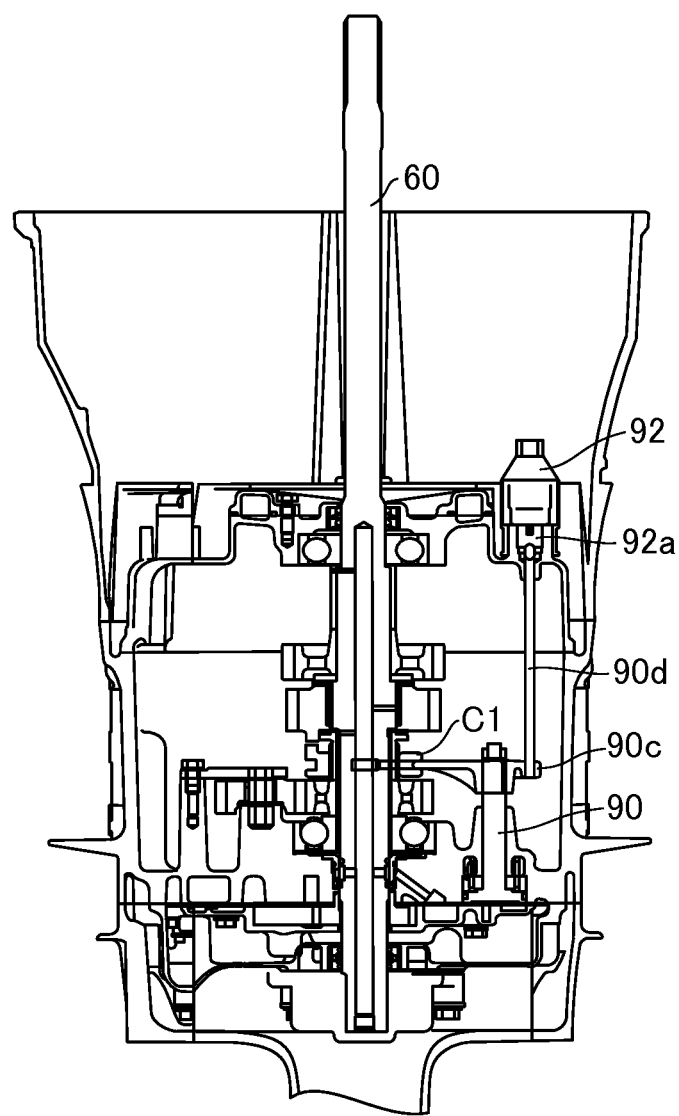
FIG. 5 is an enlarged sectional side view partly showing the outboard motor illustrated in FIG. 2.

FIG. 5 is an enlarged sectional side view partly showing the outboard motor 10 illustrated in FIG. 2.

As shown in the figure, a forward shift switch 92 is installed and produces a signal or output that indicates the coupling of the first-speed gear clutch C1 with the main first-speed gear 76.

The forward shift switch 92 is installed at a location above the shift fork 90c of the first-speed gear shift actuator 90 as shown in FIG. 5. Specifically, it is fastened to an upper distal end of an operation rod 90d that is connected to the shift fork 90c of the actuator 90 in parallel with the main shaft 60.

The forward shift switch 92 has a head portion 92a at its lower side in the figure. Specifically, the head portion 92a is provided at a position slightly remote from the upper distal end of the operation rod 90d in such a manner that, when the first-speed gear shift actuator 90 is extended for the predetermined distance, the head portion 92a is brought into contact with the upper distal end of the operation rod 90d and is displaced by the same.

The head portion 92a is connected to a connector portion (not shown) housed in the forward shift switch 92 and in response to the displacement, the connector portion produces an (electrical) ON signal or output. Thus, when the first-speed gear shift actuator 90 is extended, the first-speed gear clutch C1 is coupled with the main first-speed gear 76 so that the upper distal end of the operation rod 90d is brought into contact with the head portion 92a, the forward shift switch 92 outputs the ON signal from its connector portion. By monitoring the signal outputted from the switch 92, it becomes possible to determine whether the first-speed gear clutch C1 is coupled with the main first-speed gear 76.

Returning to the explanation of FIG. 4, the reverse gear clutch CR is connected to a reverse shift actuator 94. Similar to the first-speed gear shift actuator 90, the reverse shift actuator 94 is also a hydraulic actuator that can extend or contract and when it extends, it moves the reverse gear clutch CR in a longitudinal direction of the countershaft 68, while when it contracts, it move the clutch CR in a direction opposite thereto.

Specifically, when the actuator 94 is supplied with the hydraulic oil in its oil chamber (for contraction) 94b, it contracts and moves the shift fork 94c and the clutch CR downwardly. Moving for a predetermined distance, the clutch CR is coupled with the counter reverse gear 84. When the clutch CR is coupled with the counter reverse gear 84, since the gear 84 is engaged to the countershaft 68, the gear 84 rotates with the countershaft 68.

On the contrary, when the actuator 94 is supplied with the hydraulic oil in its oil chamber (for extension) 94a, it extends and the clutch CR upwardly to a neutral position where the clutch CR is coupled with no gears.

Figure 6:
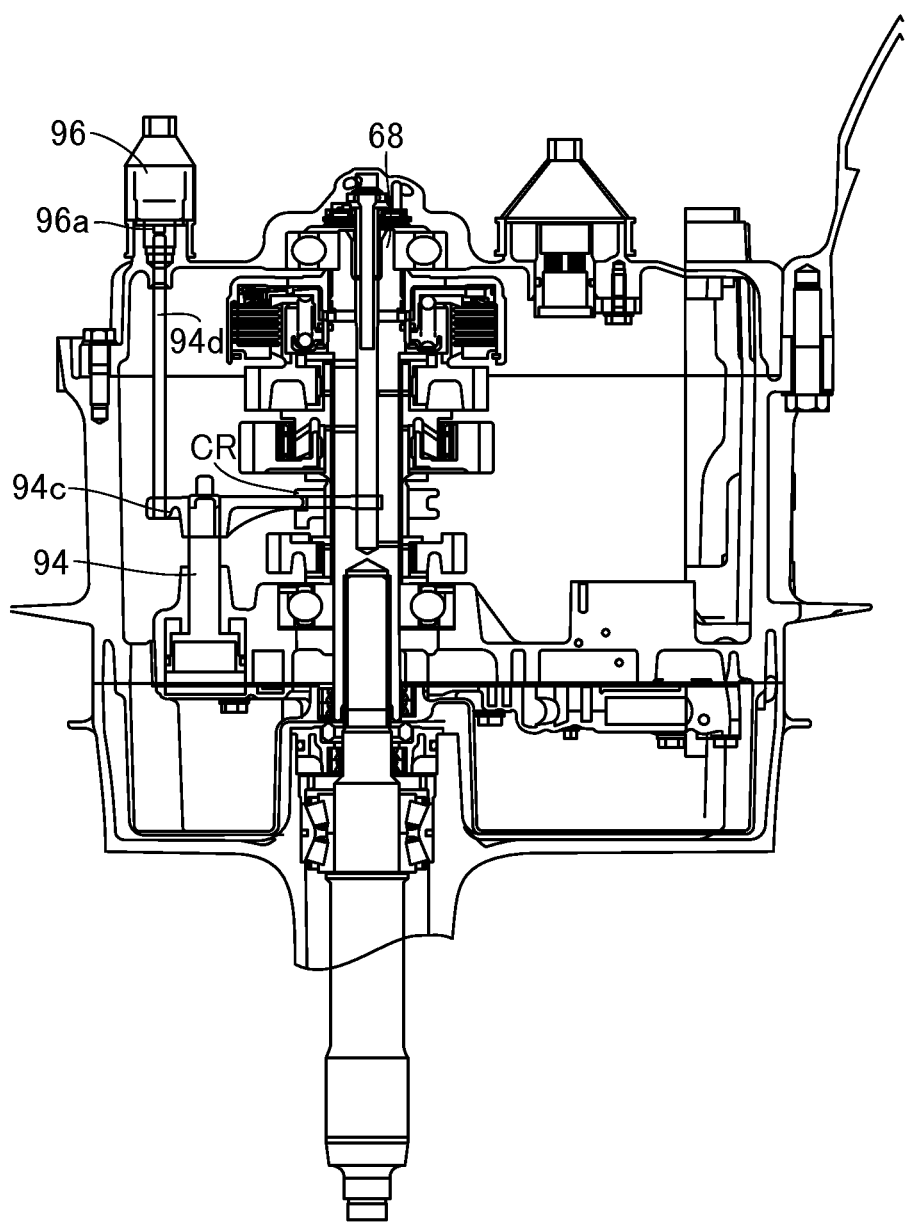
FIG. 6 is an enlarged sectional side view partly showing the outboard motor illustrated in FIG. 2.
Figure 7:
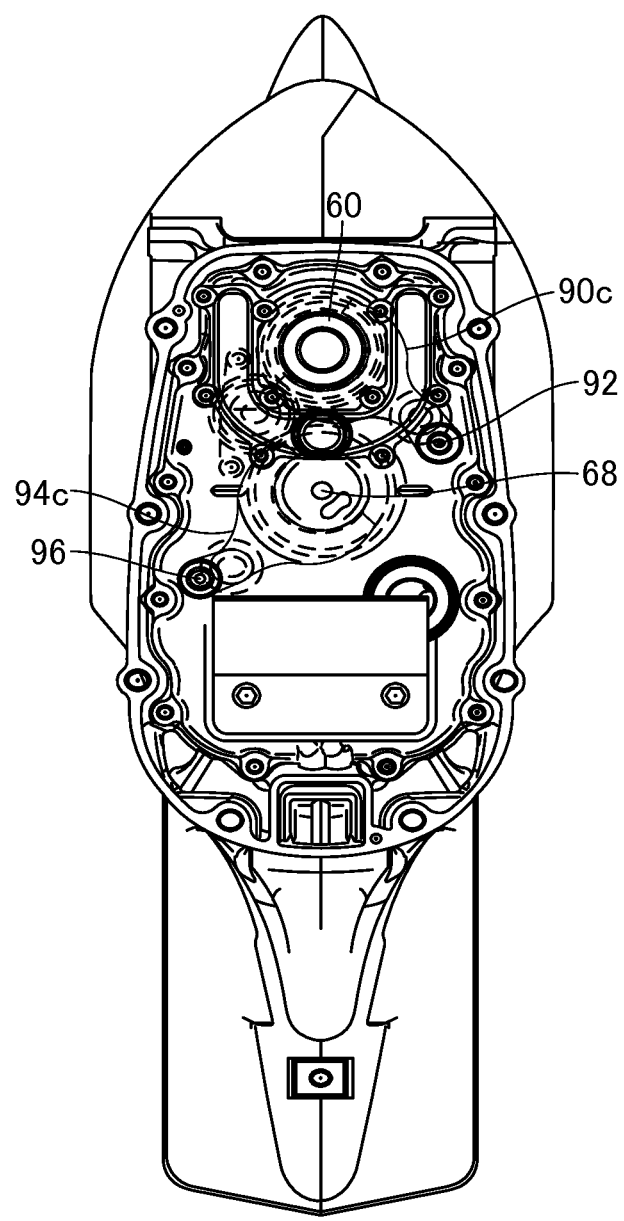
FIG. 7 is a reduced sectional plan view of the outboard motor shown in FIG. 2.

FIG. 6 is an enlarged sectional side view partly showing the outboard motor 10 illustrated in FIG. 2 and FIG. 7 is a reduced sectional plan view of the outboard motor 10 shown in FIG. 2.

As shown in the figure, a reverse shift switch 96 is installed and produces a signal or output that indicates the coupling of the reverse gear clutch CR with the counter reverse gear 84.

The reverse shift switch 96 is installed at a location above the shift fork 94c of the reverse shift actuator 94 as shown in FIG. 6 and FIG. 7. Specifically, it is fastened to an upper distal end of an operation rod 94d that is connected to the shift fork 94c of the actuator 94 in parallel with the countershaft 68.

The reverse shift switch 96 has a head portion 96a at its lower side. On the contract to the first-speed gear shift switch 92, the head portion 96a is provided at a position in contact with the upper distal end of the operation rod 94d in such a manner that, when the reverse shift actuator 94 is contracted for the predetermined distance, the upper distal end of the operation rod 94d is displaced and is remote away from the head portion 96a.

The head portion 96a is also connected to a connector portion (not shown) housed in the reverse shift switch 96 and the connector portion produces an ON signal while the head portion 96a is kept in contact with the upper distal end of the operation rod 94d. However, in response to the displacement of the upper distal end of the operation rod 94 from the head portion, it discontinues the production of an ON signal and produces an (electrical) OFF signal or output. Thus, by monitoring the signal outputted from the switch 96, it becomes possible to determine whether the reverse gear clutch CR is coupled with the counter reverse gear 84.

Returning to the explanation of FIG. 4, when the main first-speed gear 76 rotatively supported on the main shaft 60 is engaged on the main shaft 60 by the first-speed gear clutch C1, the output of the engine 50 is transmitted to the propeller 22, via the main shaft 60, the main first-speed gear 76, the counter first-speed gear 82, and the countershaft 68, so that the first speed is established.

Alternatively, when counter second-speed gear 80 rotatively supported on the countershaft 68 is engaged on the countershaft 68 by the second-speed gear clutch C2 while the first-speed gear clutch C1 has been coupled with the main first-speed gear 76 (during which the reverse gear CR is at a neutral position), the output of the engine 50 is transmitted to the propeller 22, via the main shaft 60, the main second-speed gear 74 irrotatively supported on the main shaft 60, the counter second-speed gear 80, and the countershaft 68, so that the second speed is established.

Specifically, in order to establish the second speed, under a state in which the first-speed gear clutch C1 has been coupled with the main first-speed gear 76 such that the first speed has been established (i.e., the first speed was established in advance), the counter second-speed gear 80 need be engaged on the countershaft 68 by the second-speed gear clutch C2.

As mentioned above, the counter first-speed gear 82 is installed with the one-way clutch 82a that releases the engagement of the countershaft 68 and counter first-speed gear 82 when the rotational speed of the main shaft 60 is equal to or greater than the predetermined rotational speed. With this, when the rotational speed of the main shaft 60 is relatively low, the main first-speed gear 76 and counter first-speed gear 82 transmit the output of the engine 50 to the propeller 22. When the rotational speed of the main shaft 60 is increased and becomes equal to or greater than the predetermined rotational speed, since the one-way clutch 82a releases the coupling so that the counter first-speed gear 82 idles relative to the countershaft 68, and the main second-speed gear 74 and counter second-speed gear 80 transmit the rotation of the engine 50 to the propeller 22.

Further, when the counter reverse gear 84 rotatively supported on the countershaft 68 is engaged on the countershaft 68 by the reverse gear clutch CR, the output of the engine 50 is transmitted to the propeller 22, via the main shaft 60, the main reverse gear 78 irrotatively supported on the main shaft 60, the counter reverse gear 84 and the countershaft 68 so that the reverse is established.

Furthermore, when the first-speed gear shift actuator 90 is contracted whereas the reverse shift actuator 94 is extended so that the first-speed gear clutch C1 and the reverse gear clutch CR are at their neutral position (at that time the second-speed gear clutch C2 is not engaged with the counter second-speed gear 80), the main shaft 60 and the countershaft 68 are not coupled together so that the neutral position is established.

Thus, the engagement of the gears and the shafts 60, 68 by the first-speed gear clutch C1, second-speed gear clutch C2 and reverse gear clutch CR is conducted by controlling the hydraulic pressure to be supplied from the oil pump 86 to the clutches C1, C2 and CR.

Explaining this in detail, the oil pump 86 driven by the engine 50 pumps the hydraulic oil retained in the oil pan 66a through an oil passage 100a via a strainer 102 and discharges a pressurized hydraulic oil from an outlet 86a. The pressurized hydraulic oil discharged from the outlet 86a is supplied on the one hand to a first switch valve 104a through an oil passages 100b and a second switch valve 104b through an oil passage 100d, and is supplied on the other hand to a first electromagnetic solenoid (linear solenoid) valve (hereinafter referred to as "first electromagnetic valve) 106a through an oil passage 100c branched off from the oil passage 100b and to a second electromagnetic solenoid (linear solenoid) valve (hereinafter referred to as "second electromagnetic valve) 106b through an oil passage 100e branched off from the oil passage 100d.

The first switch valve 104a is installed at the aforesaid oil passage 100b and other oil passages 100f, 100g connecting the oil pump 86 to the first-speed gear shift actuator 90. Specifically, the first switch valve 104a is connected to an oil chamber 90a of the first-speed gear shift actuator 90 through the oil passage 100f, and is connected to an oil chamber 90b of the actuator 90 through the oil passage 100g.

The second switch valve 104b is installed at the aforesaid oil passages 100b, 100d and other oil passages 100h, 100i, 100j, 100k, 100l, 100m, 100n connecting the oil pump 86 to the second-speed gear clutch C2 and the reverse shift actuator 94. Specifically, the second switch valve 104b is connected to an oil chamber 94a of the reverse shift actuator 94 through the oil passage 100h, is connected to an oil chamber 94b of the actuator 90 through the oil passage 100i, 100m, and is connected to the second-speed gear clutch C2 through the oil passage 100i, 100n.

The first and second switch valves 104a, 104b have spools that are displaceably stored therein. Each of the spools is provided with a spring at one end (left in the figure) that urged the spool toward the opposite (other) end, and is connected at the opposite end to the first or second electromagnetic valve 106a or 106b through the oil passage 100j or 100k at the opposite end.

When the first electromagnetic valve 106a is made ON (energized), its spool is displaced to connect the oil passage 100c and 100j and the hydraulic oil supplied from the oil pump 86 through the oil passage 100c is outputted to the opposite end of the first switch valve 104a through the oil passage 100j.

With this, the spool of the first switch valve 104a is displaced toward the one end, and the hydraulic oil in the oil passage 100b flows to the oil passage 100f and to the oil chamber 90a of the first-speed gear shift actuator 90. The actuator 90 is extended when supplied with the hydraulic oil in the oil chamber 90a and moves the first-speed gear clutch C1 upwardly through the shift fork 90c.

On the other hand, when the first electromagnetic valve 106a is made OFF (de-energized), its spool is not displaced so that the oil passage 100c and 100j are not connected and the hydraulic oil of the oil passage 100c is not outputted to the opposite end of the first switch valve 104a.

Accordingly, the spool of the first switch valve 104a is kept urged toward the one end and hence, the hydraulic oil in the oil passage 100b flows to the oil passage 100g and to the oil chamber 90b of the first-speed gear shift actuator 90. The actuator 90 is contracted and the first-speed gear clutch C1 is at the neutral position.

Similar to the first electromagnetic valve 106a, the spool of the second electromagnetic valve 106b is displaced when made ON (energized) and the hydraulic oil supplied from the oil pump 86 through the oil passage 100e is outputted to the opposite end of the second switch valve 104b through the oil passage 100k.

With this, the spool of the second switch valve 104b is displaced toward the one end, and the hydraulic oil in the oil passage 100d flows to the oil passage 100i and to a third switch valve 104c.

On the other hand, when the second electromagnetic valve 106b is made OFF (de-energized), its spool is not displaced so that the hydraulic oil of the oil passage 100d is supplied to the oil chamber 94a of the reverse shift actuator 94. The actuator 94 is extended and the reverse gear clutch CR is at the neutral position.

The third switch valve 104c is installed at the aforesaid oil passages 100i, 100m, 100n connecting the second switch valve 104b to the reverse shift actuator 94 or the second-speed gear clutch C2. Specifically, the third switch valve 104c is connected to the oil chamber 94b of the reverse shift actuator 94 through the oil passage 100m, and is connected to the second-speed gear clutch C2 through the oil passage 100n.

The third switch valves 104c has a spool that is displaceably stored therein. The spool is provided with a spring at one end (left in the figure) that urges the spool toward the opposite end, and is connected to an oil passage 101 at the opposite end.

When the first electromagnetic valve 106a is made ON (energized) and its spool is displaced toward the one end to discharge the hydraulic oil to the oil passage 100f, a part of the hydraulic oil is outputted to the opposite end of the third switch valve 104c through the oil passage 100l. With this, the spool of the third switch valve 104c is displaced toward the one end, and the hydraulic oil in the oil passage 100i flows to the second-speed gear clutch C2 through the oil passage 100n so that the second-speed gear clutch C2 is engaged with the counter second-speed gear 80.

On the other hand, when the first electromagnetic valve 106a is made OFF (de-energized), its spool is not displaced so that the hydraulic oil flowing the oil passage 100l is not applied to the opposite end of the third switch valve 104c. Accordingly, the spool of the third switch valve 104c is kept urged toward the one end and hence, the hydraulic oil from the oil passage 100i flows to the oil passage 100m and to the oil chamber 94b of the reverse shift actuator 94 to move the reverse gear clutch CR downwardly.

As mentioned above, when the first electromagnetic valve 106a is made ON, but the second electromagnetic valve 106b is made OFF, the first-speed gear shift actuator 90 is supplied with the hydraulic oil in its oil chamber 90a, while the second-speed gear clutch C2 is not supplied with the hydraulic oil, the main first-speed gear 76 is engaged on the main shaft 60 by the first-speed gear clutch C1, so that the first speed is established. At this time, since the reverse shift actuator 94 is supplied with the hydraulic oil in its oil chamber 94a and is extended, the reverse gear clutch CR is not engaged with the counter reverse gear 84 and is at the neutral position.

When the first and second electromagnetic valves 106a, 106b are made ON, since the oil chamber 90a of the first-speed gear shift actuator 90 and the second-speed gear clutch C2 are supplied with the hydraulic oil, the main first-speed gear 76 is engaged on the main shaft 60 by the first-speed gear clutch C1 and the counter second-speed gear 80 is engaged on the countershaft 68 by the second-speed gear clutch C2, so that the second speed is established.

When the first electromagnetic valve 106a is made OFF, but the second electromagnetic valve 106b is made ON, since the first-speed gear shift actuator 90 is supplied with the hydraulic oil in its chamber 90b, the reverse shift actuator 94 is supplied with the hydraulic oil in its oil chamber 94b, but the second-speed gear clutch C2 is not supplied with the hydraulic oil, the counter reverse gear 84 is engaged on the countershaft 68 by the reverse gear clutch CR, so that the reverse is established.

When the first and second electromagnetic valves 106a, 106b are made OFF, since the first-speed gear shift actuator 90 and reverse shift actuator 94 are supplied with the hydraulic oil in their oil chambers 90b, 94a, the first-speed gear clutch C1 and reverse gear clutch CR are at their neutral positions. And since the second-speed gear clutch C2 is not supplied with the hydraulic oil, the main shaft 60 and the countershaft 68 are not engaged together and hence, become neutral.

The transmission 24 is selected or switched its position among the forward, neutral and reverse and any gear in the forward by controlling ON/OFF of the first and second electromagnetic valves 106a, 106b in the shift control.

The hydraulic oil pressurized by the oil pump 86 is supplied to lubricant-requiring portions such as the main shaft 60, the countershaft 68, etc., through the oil passage 100b, an oil passage 100o, a regulator valve 108 and a relief valve 110. An emergency valve 112 is provided at an oil passage 100p that bypasses the first switch valve 104a, first electromagnetic valve 106a and third switch valve 104c. The emergency valve 112 comprises a manually operated valve that allows the user shift gears in case of emergency.

Here, the third switch valve 104c will be explained in detail.

Figure 8A:
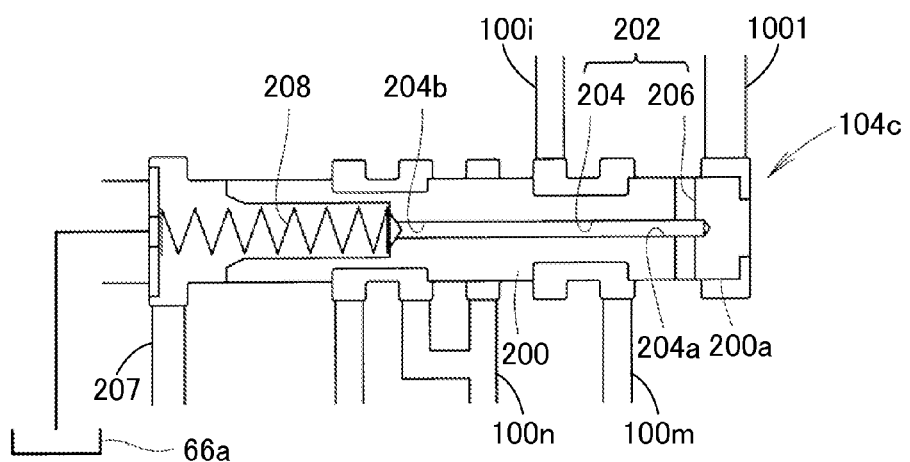
Figure 8B:
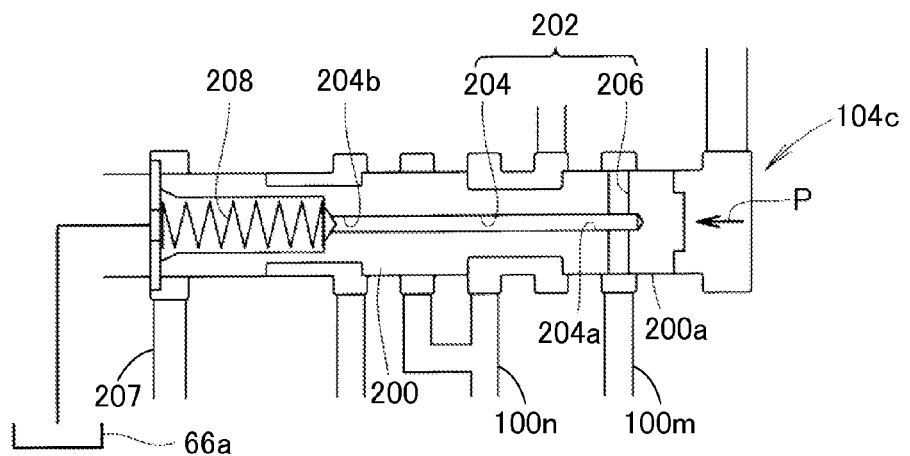

FIGS. 8A-8B is a set of explanatory view of the third switch valve 104c shown in the hydraulic circuit diagram of FIG. 4.

As shown in the figures, the third switch valve 104c is provided with a hydraulic oil (pressure) release passage 202 that can release the hydraulic oil (i.e., back side pressure) from an opposite oil chamber whose oil is against to the hydraulic oil in a concerned oil chamber in the first-speed gear shift actuator 90 and reverse shift actuator 94.

Specifically, the spool (now assigned with symbol 200) of the third switch valve 104c is bored at its center to form a longitudinal borehole 204 along the longitudinal direction of the spool 200. The longitudinal borehole 204 is communicated with at an end 204a (close to the one end) to a radial borehole 206 bored in a radial direction perpendicular to the longitudinal direction of the spool 200 and opened onto the surface 200a of the surface, and communicated with at other end 204b (close to the opposite end) to the oil pan 66a through a drain port 207.

In the figures, FIG. 8A shows an initial state in which the spool 200 of the third switch valve 104c is urged toward the one end by the spring 208, while FIG. 8B shows an operation state in which the spool 200 is urged toward the opposite (other) end by the hydraulic oil. As shown in FIG. 8B, when the hydraulic pressure P is applied to the spool 200 at the one end, the spool 200 is displaced toward the opposite end against the spring force of the spring 208.

Figure 9:
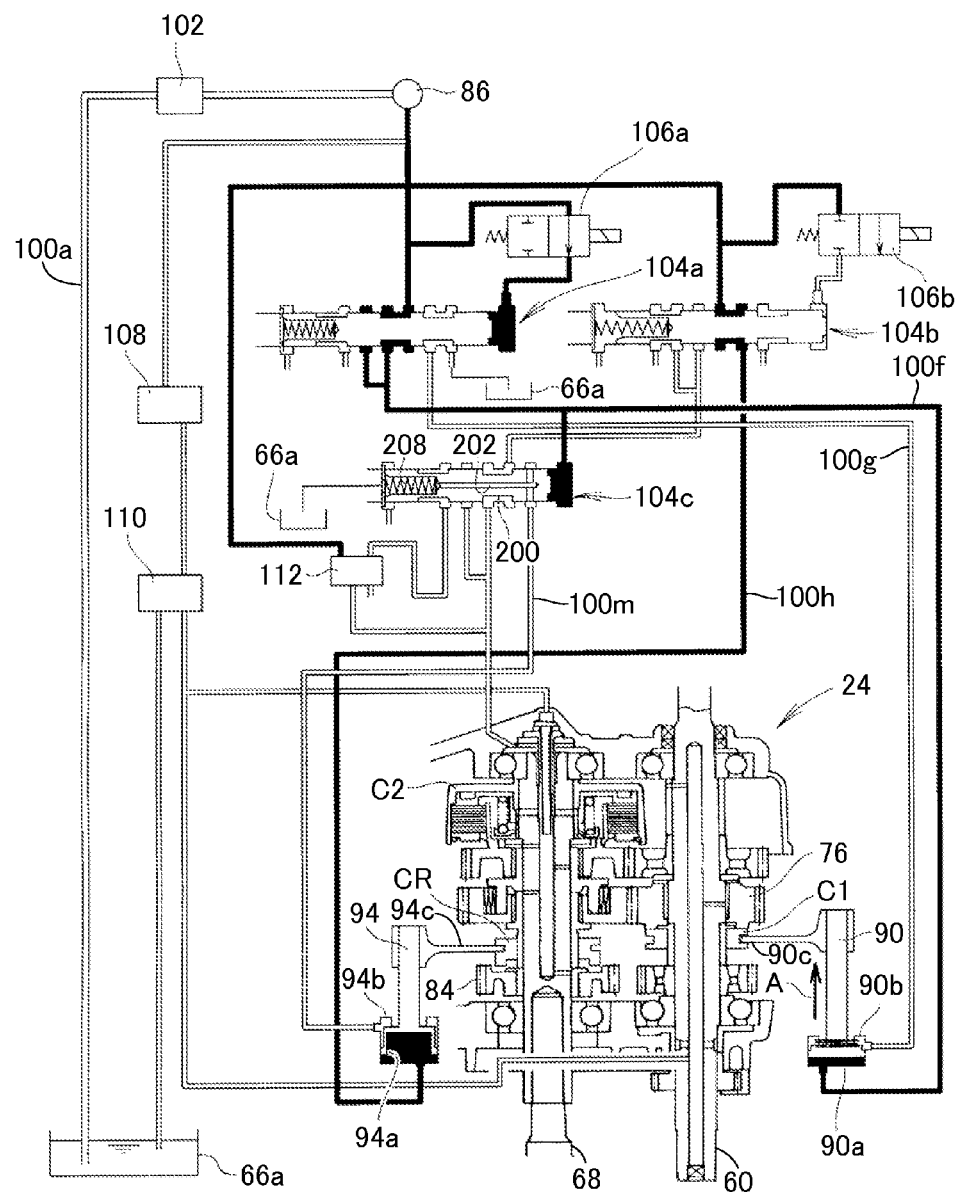
FIG. 9 is a hydraulic circuit diagram, similar to FIG. 4, but schematically showing the shifting to the first speed.

FIG. 9 is a hydraulic circuit diagram, similar to FIG. 4, but schematically showing the shifting to the first speed from the neutral position. For the ease of understanding, the main oil passages in which the hydraulic oil flows are illustrated in thick in FIGS. 9 to 12.

In order to establish the first speed, the first electromagnetic valve 106a is made ON to supply the hydraulic oil from the oil pump 86 to the oil chamber 90a of the first-speed gear shift actuator 90 through the first switch valve 104a, while the second electromagnetic valve 106b is made OFF to stop the supply of the hydraulic oil from the oil pump 86 to the second-speed gear clutch C2. As a result, the first-speed gear shift actuator 90 is moved as marked by an arrow A.

In response to the displacement of the spool 200 in the third switch valve 104c, the hydraulic oil release passage 202 is communicated with the oil chamber 94b of the reverse shift actuator 94. With this, the hydraulic oil in the chamber 94b is led to the oil pan 66a through the hydraulic oil release passage 202 and drain port 207, and the hydraulic pressure in the oil chamber 94b acting as the back pressure can surely be released.

Thus, since no additional relief valve is needed in releasing the back pressure of the oil chamber 94b and the configuration of the hydraulic circuit can be simplified. Further, since it becomes possible to make the respective gears to mesh surely, without causing a problem of concurrent gear meshing and to enhance the reliability of the hydraulic circuit.

Figure 10:
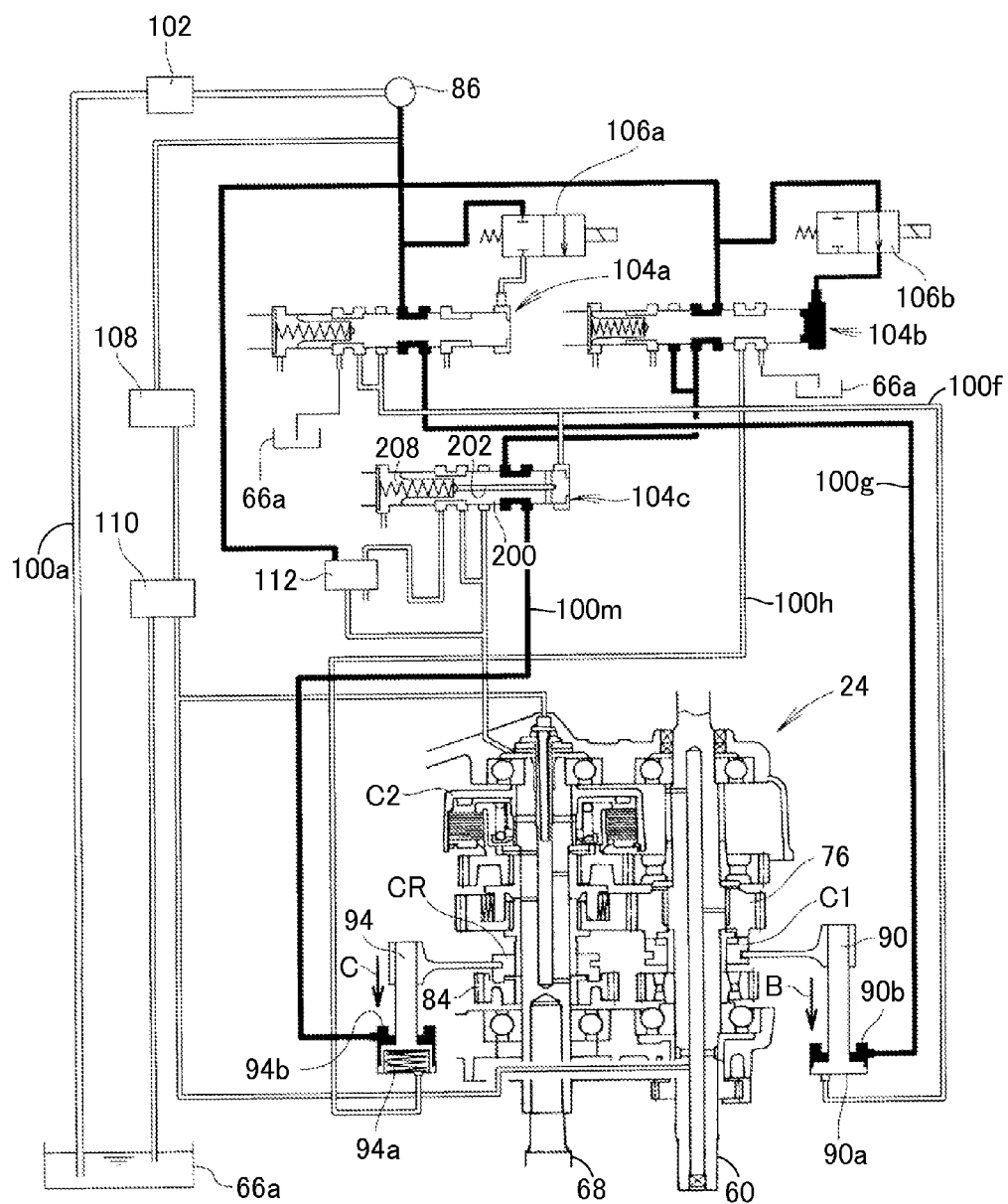
FIG. 10 is a hydraulic circuit diagram, similar to FIG. 4, but schematically showing the shifting to the reverse.

FIG. 10 is a similar hydraulic circuit diagram schematically showing the shifting to the reverse gear.

In this instance, the first electromagnetic valve 106a is made OFF to supply the hydraulic oil from the oil pump 86 to the oil chamber 90b of the first-speed gear shift actuator 90 through the first switch valve 104a, while the second electromagnetic valve 106b is made ON to supply the hydraulic oil from the oil pump 86 to the oil chamber 94b of the reverse shift actuator 94 through the second switch valve 104b and third switch valve 104c. As a result, the first-speed gear shift actuator 90 is moved as shown by an arrow B and the reverse shift actuator 94 moves as shown by an arrow C.

Since the oil chamber 90a of the first-speed gear shift actuator 90 is communicated with the oil pan 66a through the first switch valve 104a, the hydraulic oil in the oil chamber 90a is returned to the oil pan 66a in response to the movement of the first-speed gear shift actuator 90 marked by the arrow B. With this, the hydraulic oil (back pressure) that acts against the movement (operation) of the first-speed gear shift actuator 90 can readily be eliminated. Accordingly, the coupling of the first-speed gear clutch C1 and the main first-speed gear 76 can surely be released.

Since the oil chamber 94a of the reverse shift actuator 94 is communicated with the oil pan 66a through the second switch valve 104b, the hydraulic oil in the chamber 94a can be returned to the oil pan 66a in response to the movement of the reverse shift actuator 94 marked by the arrow C, the back pressure of the reverse shift actuator 94 can be eliminated and the reverse gear clutch CR can be surely coupled with the reverse gear 84, so that the transmission 24 can be shifted to the reverse gear without fail.

Figure 11:
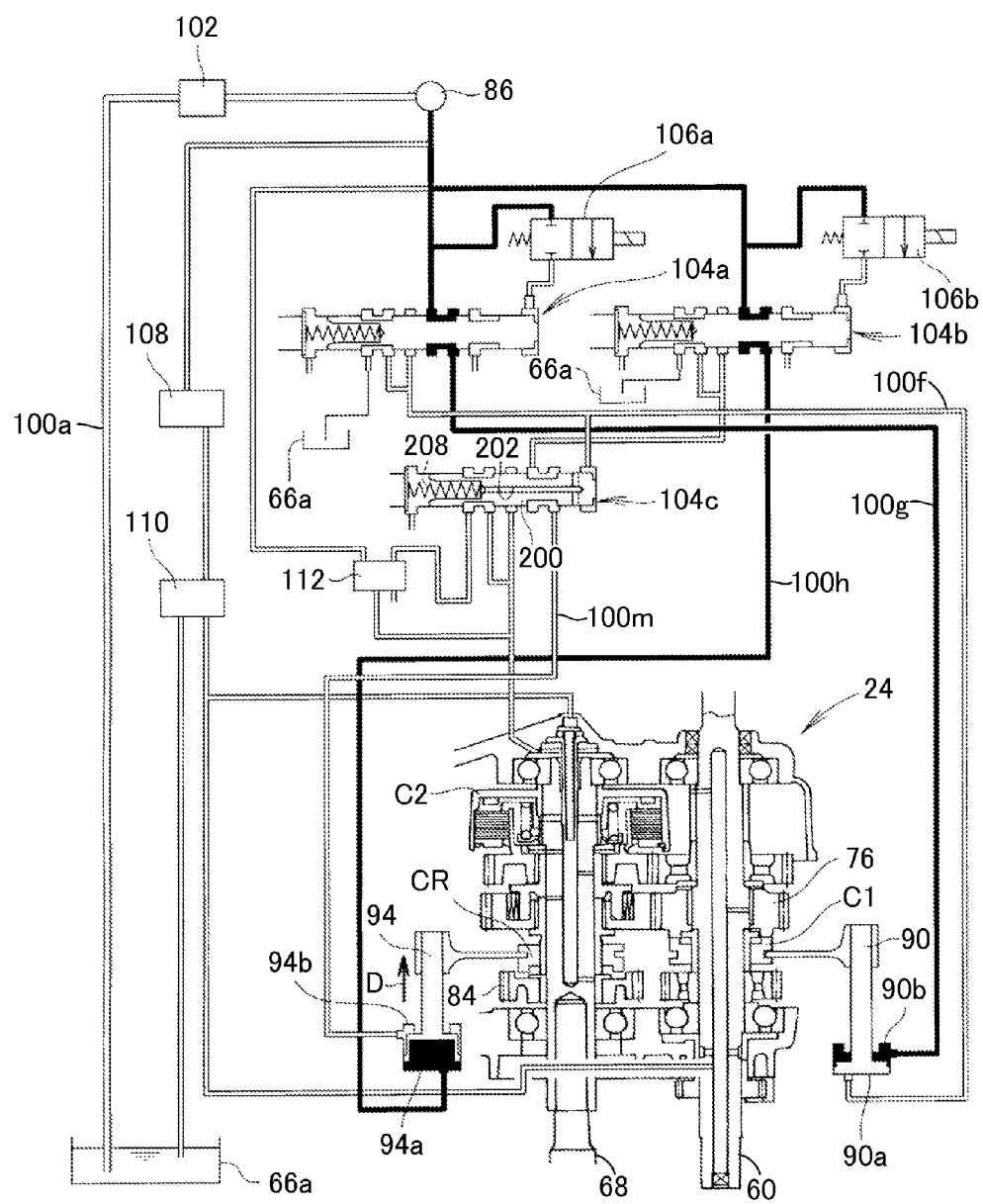
FIG. 11 is a hydraulic circuit diagram, similar to FIG. 4, but schematically showing the shifting to the neutral position.

FIG. 11 is a similar hydraulic circuit diagram schematically showing the shifting to the neutral position.

In this instance, when the second electromagnetic valve 106b is made OFF to supply the hydraulic oil from the oil pump 86 to the oil chamber 94a of the reverse shift actuator 94 through the second switch valve 104b, the reverse shift actuator 94 moves as shown by an arrow D.

Since the oil chamber 94b of the reverse shift actuator 94 is communicated with the oil pan 66a through the third switch valve 104c and second switch valve 104b, the hydraulic oil in the chamber 94b is returned to the oil pan 66a in response to the movement of the reverse shift actuator 94 marked by the arrow D. With this, the hydraulic oil (back pressure) that acts against the movement of the reverse shift actuator 94 can readily be eliminated. Accordingly, the coupling of the reverse gear clutch CR and the counter reverse gear 84 can surely be released.

Figure 12:
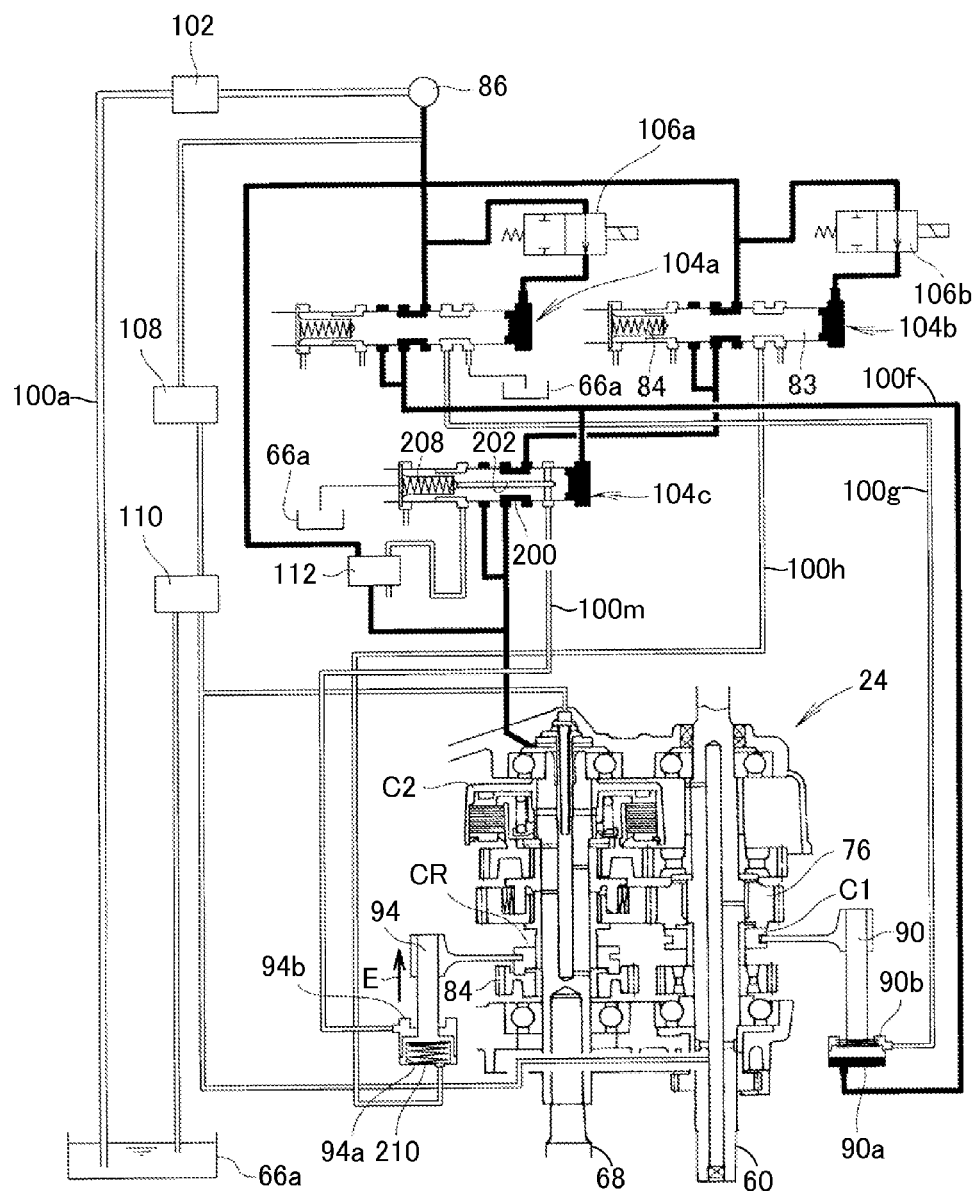
FIG. 12 is a hydraulic circuit diagram, similar to FIG. 4, but schematically showing the shifting to the second speed.

FIG. 12 is a similar hydraulic circuit diagram schematically showing the shifting to the second speed from the first speed.

In this instance, the second electromagnetic valve 106b is made ON to supply the hydraulic oil from the oil pump 86 to the second-speed gear clutch C2 through the second switch valve 104b and third switch valve 104c.

Since the oil chamber 94b of the reverse shift actuator 94 is communicated with the oil pan 66a through the hydraulic oil release passage 202, the hydraulic oil (back pressure) that acts against the movement (operation) of the reverse shift actuator 94 can readily be eliminated.

Accordingly, the reverse shift actuator 94 can surely be in the operating state marked by an arrow E by a return spring 210. With this, the decoupling of the reverse gear clutch CR and the counter reverse gear 84 can surely be maintained. In that state, the hydraulic oil from the oil pump 86 is led to the second-speed gear clutch C2 through the second switch valve 104b and third switch valve 104c, and hence the second speed is established.

Returning to the explanation of FIG. 3, a throttle opening sensor 120 is installed near the throttle valve 56 and produces an output or signal indicative of throttle opening TH of the throttle valve 56. A crank angle sensor (engine speed detector) 122 is installed near the crankshaft of the engine 50 and produces a pulse signal at every predetermined crank angle. A trim angle sensor 124 is installed near the tilting shaft 16 and produces an output or signal corresponding to a trim angle 8 of the outboard motor 10.

The outputs of the sensors 120, 122, 124 are sent to the ECU 20. The ECU 20 and the sensors including those mentioned above (the steering angle sensor 32, etc.,) and the GPS receiver 38 are connected through a standard communication such as authorized by the National Marine Electronics Association, more specifically Controller Area Network.

The ECU 20 conducts, in addition to the shift control of the transmission 24 mentioned above, trim angle control to control the trim angle θ of the trim unit 26, throttle opening control to control the throttle opening TH by operating the throttle electric motor 58, engine control to control fuel injection and ignition timing of the engine 50. The ECU 20 functions as a control apparatus of the transmission 24 constituted as a Drive-By-Wire fashion in which the mechanical connection between the operation system (including the steering wheel 30 and shift/throttle lever 34) and the outboard motor 10 is cut out.

Figure 13:
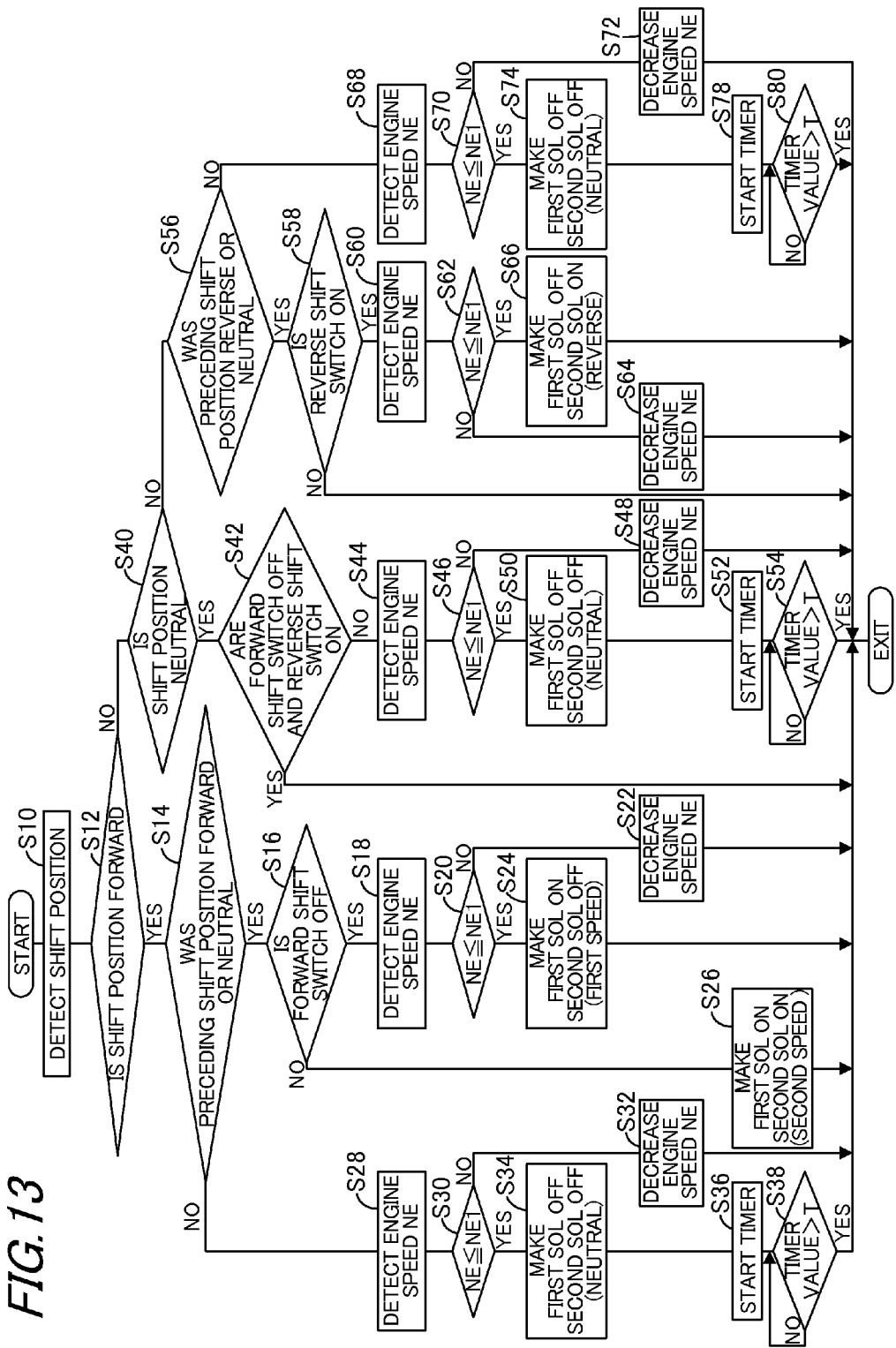
FIG. 13 is a flowchart showing a transmission control operation by an electronic control unit of an outboard motor illustrated in FIG. 1.

FIG. 13 is a flowchart showing the shift control operated by the ECU 20. The illustrated program is executed by the ECU 20 at predetermined intervals, e.g., 100 milliseconds.

The program begins at S10, in which the shift position is detected or determined from the output of the shift position sensor 36. Specifically, the position is detected by determining which position among the forward, neutral and reverse the output voltage of the shift position sensor 36 is corresponding to. More specifically, it is detected or determined the position is forward when the sensor output voltage is greater than a predetermined first value (e.g., 3V), is neutral when the sensor output voltage is equal to or smaller than the predetermined first value, but is greater than a predetermined second value (e.g., 2V), and is reverse when the sensor output voltage is equal to or less than the predetermined second value.

The program then proceeds to S12, in which it is determined whether the detected shift position is the forward and if the result is affirmative, the program proceeds to S14, in which it is determined whether the shift position in the preceding (last) program loop was the forward or neutral.

When it is affirmative in S14, i.e., when it is determined that the shift position is changed from neutral to forward or remains unchanged, the program proceeds to S16, in which it is determined whether the forward shift switch 92 is made OFF, in other words it is determined whether it is under a situation in which the first-speed gear clutch C1 is not coupled with the main first-speed gear 76.

When the result in S16 is affirmative, the program proceeds to S18, in which the engine speed NE is detected by measuring the intervals of the pulses outputted from the crank angle sensor 122, and to S20, in which it is determined whether the detected engine speed NE is equal to or smaller than a predetermined engine speed NE1 (e.g., 800 rpm).

When the result in S20 is negative, the program proceeds to S22, in which the engine speed NE is decreased to mitigate shock in shifting. Specifically, this is done by retarding the ignition timing or by decreasing the quantity of fuel injection to be supplied to the engine 50 in accordance with a routine not shown.

On the other hand, when the result in S20 is affirmative, the program proceeds to S24, in which the first electromagnetic valve (shown as "FIRST SOL" in the FIG. 106a is made ON, but the second electromagnetic valve (shown as "SECOND SOL" in the FIG. 106b is made OFF to shift the gears of the transmission 24 to the first speed.

When the shift position is shifted to the first speed in S24, the first-speed gear clutch C1 is coupled with the main first-speed gear 76 and the forward shift switch 92 is made ON. Accordingly, the result in S16 in the next program loop becomes negative and the program proceeds to S26, in which the first and second electromagnetic valves 106a, 106b are made ON to shift to the second speed.

When the result in S14 is negative, i.e., when it is determined that the shift position is shifted from reverse to forward, the program proceeds to S28, in which the engine speed NE is detected, to S30, in which it is determined whether the detected engine speed NE is equal to or smaller than the predetermined engine speed NE1.

When the result in S30 is negative, the program proceeds to S32, in which the engine speed NE is decreased in the same manner as mentioned in S22. On the other hand, when the result in S30 is affirmative, the program proceeds to S34, in which the first and second electromagnetic valves 106a, 106b are made OFF to shift to the neutral position.

The program next proceeds to S36, in which a timer is started to start time measurement and proceeds to S38, in which it is determined whether the value of the timer is greater than a predetermined time period T (e.g., one second) and if it is, the program is terminated. To be more specific, the control according to the embodiment is conducted such that, when the shift position is shifted from reverse to neutral (in S10 to S14), and the engine speed NE becomes equal to or smaller than the predetermined engine speed NE1, the gear is shifted to neutral (S28 to S34) and the neutral condition is kept for the predetermined time period T (S36, S38).

When the result in S12 is negative, the program proceeds to S40, in which it is determined whether the shift position is neutral. When the result in S40 is affirmative, the program proceeds to S42, in which it is determined whether the forward shift switch 92 is made OFF and the reverse shift switch (shown as "RVS SHIFT SW" in the FIG. 96 is made OFF. In other words, it is determined in S42 whether the first-speed gear clutch C1 is not coupled with the main first-speed gear 76 and the reverse gear clutch CR is not coupled with the counter reverse gear 84, i.e., it is determined whether both the first-speed gear clutch C1 and the reverse gear clutch CR are at their neutral positions.

When the result in S42 is affirmative, the program skips the processing in S44 to S54. On the contrary, when the result in S42 is negative, i.e., when it is determined that one of the forward shift switch 92 and the reverse shift switch 96 is made ON, the program proceeds to S44, in which the engine speed NE is detected, and to S46, in which it is determined whether the detected engine speed NE is equal to or smaller than the predetermined engine speed NE1.

When the result in S46 is negative, the program proceeds to S48, in which the engine speed NE is decreased. When the result in S46 is affirmative, the program proceeds to S50, in which the first and second electromagnetic valves 106a, 106b are made OFF to shift to the neutral position. The program then proceeds to S52, in which the timer is started and to S54, in which when it is determined that the timer value is equal to or greater than the predetermined time period T, the program is terminated.

When the result in S40 is negative, i.e., when the shift position is reverse, the program proceeds to S56, in which it is determined whether the shift position in the preceding program loop was reverse or neutral.

When the result in S56 is affirmative, the program proceeds to S58, in which it is determined the reverse shift switch 96 is made OFF. When the result in S58 is negative, the program skips processing in S60 to S66. When the result in S58 is affirmative, the program proceeds to S60, in which the engine speed NE is detected, and to S62, in which it is determined whether the detected engine speed NE is equal to or smaller than the predetermined engine speed NE1.

When the result in S62 is negative, the program proceeds to S64, in which the engine speed NE is decreased. When the result in S62 is affirmative, the program proceeds to S66, in which the first electromagnetic valve 106a is made OFF and the second electromagnetic valve 106b is made ON, so that the position is shifted to reverse.

When the result in S56 is negative, i.e., when it is determined that the preceding position was forward, but the present position is reverse, in other words, when the shift position is shifted from forward to reverse, the program proceeds to S68, in which the engine speed NE is detected, and to S70, in which it is determined whether the engine speed NE is equal to or smaller than the predetermined engine speed NE1.

When the result in S70 is negative, the program proceeds to S72, in which the engine speed NE is decreased, but if it is affirmative in S70, the program proceeds to S74, in which the first and second electromagnetic valves 106a, 106b are made OFF so that the position is determined to be neutral. The program then proceeds to S78, S80 in the same manner and is terminated.

Thus, the shift control according to the embodiment is conducted in such a way that, when the shift position is changed from forward to reverse (in S40, S56) and the engine speed NE becomes equal to or smaller than the predetermined engine speed NE1, the shift position is changed to neutral (in S68 to S74) and the neutral condition is kept for the predetermined time period T (S78, S80).

Figure 14:
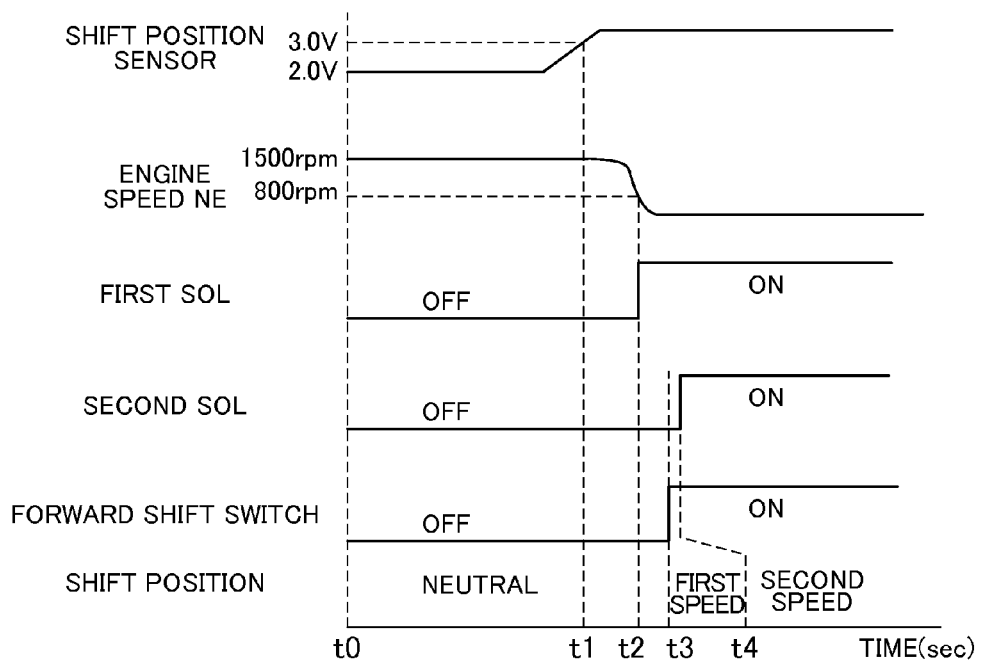
FIG. 14 is a time chart explaining the processing of the flowcharts in FIG. 13.

FIG. 14 is a time chart showing a part of the processing of FIG. 13 flowchart.

Here it is assumed that the shift/throttle lever 34 is at the neutral position at time t0, i.e., the output voltage of the shift position sensor 36 is between the predetermined second value (e.g., 2V) and the predetermined first value (e.g., 3V) indicating that it is at the neutral position, and then at time t1, the shift/throttle lever 34 is changed to the forward position, i.e., the sensor output voltage becomes greater than the predetermined first value (in S10 to S14).

At this time point, since the forward shift switch 92 has been kept OFF and the engine speed NE is greater than the predetermined engine speed NE1 (e.g., 800 rpm), the engine speed NE is decreased.

If it assumed that, the engine speed NE becomes equal to or smaller than the predetermined engine speed NE1 in response to the engine speed decrease at time point t2, the first electromagnetic valve 106a is made ON, but the second electromagnetic valve 106b is kept OFF, so that it is shifted to the first speed (in S20, S24).

If it is assumed that, when the first-speed gear clutch C1 is coupled with the main first-speed gear 76 at time t3 in response to the change to the ON condition of the first electromagnetic valve 106a at time t2, the first and second electromagnetic valves 106a, 106b are made ON at time t4 (more precisely, since the valve 106a was made ON, only the valve 106b is made ON), so that it is shifted to the second speed (in S26).

FIG. 15 is a time chart showing the rest of the processing of FIG. 13 flowchart. The figure is based on an example in which the shift/throttle lever 34 is suddenly changed from the reverse position to the forward position.

As shown in the figure, it is assumed that the shift/throttle lever 34 is at the reverse position at time t0, i.e., the output voltage of the shift position sensor 36 is equal to or smaller than the predetermined second value (e.g., 2V) indicative of the reverse position, and then at time t1, the shift/throttle lever 34 is changed to the forward position, i.e., the sensor output voltage becomes greater than the predetermined first value (e.g., 3V) indicative of the forward position (in S10 to S14). At this time point, since the engine speed NE is greater than the predetermined engine speed NE1 (e.g., 800 rpm), the engine speed NE is decreased (S28 to S32).

If it assumed that, the engine speed NE becomes equal to or smaller than the predetermined engine speed NE1 at time point t2 in response to the engine speed decrease, the second electromagnetic valve 106b is made OFF (the first electromagnetic valve 106a is kept OFF), so that the shift position is changed to neutral (in S30, S34).

If it is assumed that, when the neutral condition is kept for the predetermined time period (e.g., one second) at time t2 and on (S36, S38), the first electromagnetic valve 106a is made ON (the second electromagnetic valve 106b is kept OFF) at time t3 to shift the gear to the first speed (in S24). Since the gear position is changed to the neutral position at time t1, the reverse shift switch 96 is made OFF.

When the first-speed gear clutch C1 is coupled with the main first-speed gear 76 at time t4, the first and second electromagnetic valve 106a, 106b are made ON (more precisely, only the second electromagnetic valve 106b is made ON), so that it is shifted to the second speed (in S26).

In other words, when the shift/throttle lever 34 is changed from reverse to forward and the engine speed NE becomes equal to or smaller than the predetermined engine speed NE1, the first and second electromagnetic valves 106a, 106b are made OFF to change the shift position to neutral. Then after the neutral condition has been kept for the predetermined time period, the shift position is changed to forward, more precisely to the first speed.

FIG. 15 shows the example in which the shift/throttle lever 34 is changed from the reverse position to the forward position. However, this will be the same when the shift/throttle lever 34 is changed from forward to reverse. In that case, when the shift/throttle lever 34 is changed from forward to reverse and the engine speed NE becomes equal to or smaller than the predetermined engine speed NE1, the first and second electromagnetic valve 106a, 106b are made OFF to change the shift position to neutral and then to change it to reverse after the neutral condition has been kept for the predetermined time period.

As stated above, the embodiment is configured to have an outboard motor adapted to be mounted on a stern (12a) of a hull (12) of a boat (1) and installed with an internal combustion engine (50) to power a propeller (22) through a power transmission shaft (main shaft 60, propeller shaft 62), comprising: a transmission (24) having at least a first-speed gear (main first-speed gear 76, counter first-speed gear 82) and a second-speed gear (main second-speed gear 74, counter second-speed gear 80) each supported on the power transmission shaft, a first-speed gear clutch (C1) that is made of a mechanical dog clutch and is adapted to engage the first-speed gear on the transmission shaft, a second-speed gear clutch (C2) that is made of a hydraulic clutch and is adapted to engage the second-speed gear on the power transmission shaft, and a first-speed gear shift actuator (90) that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed; an hydraulic oil pump (86) that discharges a pressurized hydraulic oil when driven by the engine; a first electromagnetic solenoid valve (106a) provided at an oil passage (100b, 100c, 100f, 100g, etc.) connecting the pump and the first-speed gear shift actuator; and a second electromagnetic solenoid valve (106b) provided at an oil passage (100b, 100d, 100e, 100n, etc.) connecting the pump and the second-speed gear clutch.

With this, it becomes possible to supply the hydraulic oil (pressure) to the clutch sufficiently so as not to cause a problem of the tooth hammering noise, without increasing the capacity of the oil pump 86. To be more specific, in the transmission 24, in order to establish the second speed, it needs to engage the first-speed gear and the second-speed gear on the power transmission shaft. If doing so at the same time, a larger amount of hydraulic oil is needed.

Since, however, the embodiment is configured such that the second speed is established when the second-speed gear is engaged on the power transmission shaft while the first speed has been established (in other words the first-speed gear was engaged on the power transmission shaft in advance). Accordingly, in order to establish the second speed, it suffices to if the second-speed gear clutch C2 is supplied with the hydraulic oil. With this, it becomes possible to supply the hydraulic oil to the second-speed gear clutch C2 sufficiently without increasing the capacity of the oil pump 86.

In addition, since the hydraulic oil is supplied to the second-speed gear clutch C2 sufficiently at shifting to the second speed, it becomes possible to prevent a half-engaged state of the clutch C2 and hence, to prevent the tooth hammering noise due to the half-engaged state of the clutch C2.

The outboard motor further includes: a first switch valve (104a) provided at the oil passage connecting the pump and the first-speed gear shift actuator and is adapted to supply a hydraulic oil supplied by the pump to the first-speed gear shift actuator; a second switch valve (104b) provided at the oil passage connecting the pump and the second-speed gear clutch and is adapted to supply the hydraulic oil supplied by the pump to the second-speed gear clutch; and a third switch valve (104c) provided at an oil passage connecting the second switch valve and the second-speed gear clutch and is adapted to supply the hydraulic oil supplied by the pump through the second switch valve to the second-speed gear clutch, wherein the first electromagnetic solenoid valve (106a) is connected to the first-speed gear shift actuator (90) and the third switch valve (104c) through the first switch valve (104a), while the second electromagnetic solenoid valve (106b) is connected to the third switch valve (104c) through the second switch valve (104b).

With this, in addition to the effects and advantages mentioned above, it becomes possible to supply the hydraulic oil to the clutch sufficiently, without increasing the capacity of the oil pump 86, in a simple configuration.

In the outboard motor, the power transmission shaft comprises a main shaft (60) and a propeller shaft (62), the transmission (24) is interposed between the main shaft and the propeller shaft, the transmission (24) comprising: the main shaft (60); a countershaft (68) disposed in parallel with the main shaft; a main first-speed gear (76) rotatably supported on the main shaft; a main second-speed gear (74) irrotatably supported on the main shaft; a counter first-speed gear (82) irrotatably supported on the countershaft and meshed with the main first-speed gear; a counter second-speed gear (80) rotatably supported on the countershaft and meshed with the main second-speed gear; the first-speed gear clutch (C1) that is irrotatably but longitudinally movably supported on the main shaft and is adapted to couple with the main first-speed gear to engage the main first-speed gear on the main shaft when moved in one longitudinal direction; the second-speed gear clutch (C2) adapted to engage the counter second-speed gear on the countershaft when supplied with the hydraulic oil supplied by the pump; and the first-speed gear shift actuator (90) that is adapted to move the first-speed gear clutch in the one longitudinal direction to couple the first-speed gear clutch with the first-speed gear.

With this, in addition to the effects and advantages mentioned above, it becomes possible to supply the hydraulic oil to the clutch sufficiently, without increasing the capacity of the oil pump 86, in a simpler configuration.

In the outboard motor, the transmission further includes; a reverse gear (main reverse gear 78, counter reverse gear 84) supported on the power transmission shaft; a reverse gear clutch (CR) adapted to engage the reverse gear on the power transmission shaft; and a reverse shift actuator (94) adapted to couple the reverse gear with the reverse gear clutch such that a power of the engine is transmitted to the propeller through the reverse gear when the reverse gear is engaged on the power transmission shaft; wherein the second electromagnetic solenoid valve (106b) is provided at an oil passage (100b, 100d, 100h, etc.) connecting the pump and the reverse shift actuator.

With this, in addition to the effects and advantages mentioned above, it becomes possible to prevent a problem of concurrent gear meshing. Specifically, if the gear is shifted from forward to reverse or vice versa in response to the operation of the shift/throttle lever 34 solely, the gears in the forward side and reverse side are erroneously meshed concurrently. However, configured in the foregoing manner, it becomes possible to avoid the problem of concurrent gear meshing.

The outboard motor further includes: a first switch valve (104a) provided at the oil passage connecting the pump and the first-speed gear shift actuator and is adapted to supply a hydraulic oil discharged by the pump to the first-speed gear shift actuator; a second switch valve (104b) provided at the oil passage connecting the pump and the reverse shift actuator (94) and is adapted to supply the hydraulic oil supplied by the pump to one oil chamber (94a) of the reverse shift actuator (94); and a third switch valve (104c) provided at an oil passage connecting the second switch valve and the reverse shift actuator and is adapted to supply the hydraulic oil supplied by the pump through the second switch valve to other oil chamber (94b) of the reverse shift actuator (94), wherein the first electromagnetic solenoid valve is connected to the first-speed gear shift actuator through the first switch valve, while the second electromagnetic solenoid valve is connected to the reverse shift actuator and the third switch valve through the second switch valve.

With this, in addition to the effects and advantages, it becomes possible to prevent a problem of concurrent gear meshing of the gears in the forward side and reverse side in a simple configuration.

In the outboard motor, the power transmission shaft comprises a main shaft (60) and a propeller shaft (62), the transmission (24) is interposed between the main shaft and the propeller shaft, the transmission (24) comprising: the main shaft (60); a countershaft (68) disposed in parallel with the main shaft; a main first-speed gear (76) rotatably supported on the main shaft; a main reverse gear (78) irrotatably supported on the main shaft; a counter first-speed gear (82) irrotatably supported on the countershaft and meshed with the main first-speed gear; a counter reverse gear (84) rotatably supported on the countershaft and meshed with the main reverse gear; the first-speed gear clutch (C1) that is irrotatably but longitudinally movably supported on the main shaft and is adapted to couple with the main first-speed gear to engage the main first-speed gear on the main shaft when moved in one longitudinal direction; the reverse gear clutch (CR) that is irrotatably but longitudinally movably supported on the countershaft and is adapted to couple with the counter reverse gear to engage the counter revere gear on the countershaft when moved in one longitudinal direction; the first-speed gear shift actuator that is adapted to move the first-speed gear clutch in the one longitudinal direction to couple the first-speed gear clutch with the first-speed gear; and a reverse shift actuator that is adapted to move the reverse gear clutch in the one longitudinal direction to couple with the reverse gear clutch with the reverse gear.

With this, in addition to the effects and advantages, it becomes possible to prevent a problem of concurrent gear meshing of the gears in the forward side and reverse side in a simple configuration.

In the outboard motor, the third switch valve (104c) is provided with a hydraulic oil release passage (202) that is adapted to release the hydraulic oil from the other oil chamber (94b) of the reserve shift actuator (94) that acts against operation of the one oil chamber (94a) of the reserve shift actuator.

With this, in addition to the effects and advantages, it becomes possible to shift from the first speed to the second speed or vice versa surely.

In the outboard motor, the hydraulic oil release passage (202) is adapted to release the hydraulic oil from the other oil chamber (94b) of the reserve shift actuator (94) when one of the first-speed gear and the second-speed gear is engaged on the power transmission shaft.

With this, in addition to the effects and advantages, it becomes possible to shift from the first speed to the second speed or vice versa surely, in a simple configuration.

In the outboard motor, the hydraulic oil release passage (202) comprises a borehole (204, 206) bored in a spool (200) of the third switch valve (104c) and is communicated to the other oil chamber (94b) of the release shift actuator (94).

With this, in addition to the effects and advantages, it becomes possible to shift from the first speed to the second speed or vice versa surely, in a simple configuration.

The embodiment is configured to have an apparatus for controlling operation of an outboard motor adapted to be mounted on a stern 12a of a hull (12) of a boat (1) and installed with an internal combustion engine (50) to power a propeller (22) through a power transmission shaft (main shaft 60, propeller shaft 62), comprising: a transmission (24) having at least a first-speed gear (76, 82) and a second-speed gear (74, 80) each supported on the power transmission shaft, a first-speed gear clutch (C1) that is made of a mechanical dog clutch and is adapted to engage the first-speed gear on the power transmission shaft, a second-speed gear clutch (C2) that is made of a hydraulic clutch and is adapted to engage the second-speed gear on the power transmission shaft, and a first-speed gear shift actuator (90) that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed; an hydraulic oil pump (86) that discharges a pressurized hydraulic oil when driven by the engine; a first electromagnetic solenoid valve (106a) provided at an oil passage (100b, 100c, 100f, 100g, etc.) connecting the pump and the first-speed gear shift actuator; a second electromagnetic solenoid valve (106b) provided at an oil passage (100b, 100d, 100e, 100n, etc.) connecting the pump and the second-speed gear clutch; a shift/throttle lever position detector (ECU 20) that detects whether a position of a shift/throttle lever (34) manually operable by an operator is changed from neutral to forward; and a controller (ECU 20) that controls operation of the first and second electromagnetic solenoid valves (106a, 106b) in such a manner that the first-speed gear clutch is coupled with the first-speed gear to establish the first speed and then the established first speed is shifted to the second speed, when the shift/throttle lever position is detected to be changed from the neutral to the forward.

With this, it becomes possible to supply the hydraulic oil (pressure) to the clutch sufficiently so as not to cause a problem of the tooth hammering noise, without increasing the capacity of the oil pump 86. In addition thereto, it becomes possible to control the hydraulic pressure at shifting more firmly.

The apparatus further includes: an engine speed detector (ECU 20, S18) that detects whether a speed of the engine is equal to or smaller than a predetermined engine speed; and the controller controls operation of the first and second electromagnetic solenoid valves in such a manner that the first-speed gear clutch is coupled with the first-speed gear to establish the first speed and then the established first speed is shifted to the second speed if the engine speed is detected to be equal to or smaller than the predetermined engine speed when the shift/throttle lever position is detected to be changed from the neutral to the forward (ECU 20, S12 to S26).

With this, in addition to the effects and advantages, it becomes possible to shift the gears from the first speed to the second speed in a smooth manner.

In the apparatus, the transmission (24) comprises: a reverse gear (78, 84) supported on the power transmission shaft; a reverse gear clutch (CR) adapted to engage the reverse gear on the power transmission shaft; and further including: a second shift/throttle lever position detector (ECU 20, S10 to S14, S40, S56) that detects whether a position of a shift/throttle lever is manually operable by an operator is changed from reverse to forward or from forward to reverse; and the controller controls operation of the first and second electromagnetic solenoid valves in such a manner that, when the shift lever is detected to be changed from reverse to forward or from forward to reverse, once the first-speed gear clutch is decoupled from the first-speed gear and the reverse gear clutch is decoupled from the reverse gear and then the first-speed gear is coupled with the first-speed gear or the reverse gear is coupled with the reverse gear clutch (ECU 20, S12, S14, S34, S50, S74).

With this, in addition to the effects and advantages, it becomes possible to prevent a problem of concurrent gear meshing of the gears in the forward side and reverse side in a simple configuration.

In the apparatus, the controller controls operation of the first and second electromagnetic solenoid valves in such a manner that, when the shift lever is detected to be changed from reverse to forward or from forward to reverse, once the first-speed gear clutch is kept decoupled from the first-speed gear for a predetermined time period and the reverse gear clutch is kept decoupled from the reverse gear for a predetermined time period and then the first-speed gear is coupled with the first-speed gear or the reverse gear is coupled with the reverse gear clutch (ECU 20, S12, S14, S34 to S38).

With this, in addition to the effects and advantages, it becomes possible to prevent a problem of concurrent gear meshing of the gears in the forward side and reverse side in a simple configuration.

The apparatus further includes: an engine speed detector (ECU 20, S28, S68) that detects whether a speed of the engine is equal to or smaller than a predetermined engine speed; and the controller controls operation of the first and second electromagnetic solenoid valves in such a manner that, when the shift lever is detected to be changed from reverse to forward or from forward to reverse, once the first-speed gear clutch is decoupled from the first-speed gear and the reverse gear clutch is decoupled from the reverse gear and then the first-speed gear is coupled with the first-speed gear or the reverse gear is coupled with the reverse gear clutch, when the engine speed is detected to be equal to or smaller than the predetermined engine speed (ECU 20, S12, S14, S28 to S38).

With this, in addition to the effects and advantages, it becomes possible to prevent a problem of concurrent gear meshing of the gears in the forward side and reverse side in a simple configuration, and to shift the gears between forward and reverse in a smooth manner.

It should be noted that, although the outboard motor is exemplified above, this invention can be applied to an inboard motor equipped with a transmission. Further, although, in S22, etc., the engine output is decreased by retarding the ignition timing or reducing the fuel injection amount, it may be decreased through the both operations, or through ignition-cut, fuel-cut, or the like.

It should also be noted that, although the head portion 92a of the forward shift switch 92 is fastened to the operation rod 90d in such a manner that, when the first-speed gear shift actuator 90 is extended for the predetermined distance, it is brought into contact with the upper distal end of the operation rod 90d, while the head portion 96a of the reverse shift switch 96 is fastened to the operation rod 94d at a position in contact with the upper distal end of the operation rod 94d in such a manner that, when the reverse shift actuator 94 is contracted for the predetermined distance, the upper distal end of the operation rod 94d is displaced and is remote away from the head portion 96a, this is vice versa.

It should further be noted that various predetermined values are mentioned in the above, they are examples and should accordingly be limited thereto.

Japanese Patent Application Nos. 2012-179339 and 2012-179340 filed on Aug. 13, 2012 and No. 2012-182231 filed on Aug. 21, 2012, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An outboard motor adapted to be mounted on a stern of a hull of a boat and installed with an internal combustion engine to power a propeller through a power transmission shaft, comprising:
    a transmission having at least a first-speed gear and a second-speed gear each supported on the power transmission shaft, a first-speed gear clutch that is made of a mechanical dog clutch and is adapted to engage the first-speed gear on the power transmission shaft, a second-speed gear clutch that is made of a hydraulic clutch and is adapted to engage the second-speed gear on the power transmission shaft, and a first-speed gear shift actuator that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed;
    an hydraulic oil pump that discharges a pressurized hydraulic oil when driven by the engine;
    a first electromagnetic solenoid valve provided at an oil passage connecting the pump and the first-speed gear shift actuator;
    a second electromagnetic solenoid valve provided at an oil passage connecting the pump and the second-speed gear clutch;
    a first switch valve provided at the oil passage connecting the pump and the first-speed gear shift actuator and is adapted to supply the hydraulic oil discharged by the pump to the first-speed gear shift actuator;
    a second switch valve provided at the oil passage connecting the pump and the second-speed gear clutch and is adapted to supply the hydraulic oil discharged by the pump to the second-speed gear clutch; and
    a third switch valve provided at an oil passage connecting the second switch valve and the second-speed gear clutch and is adapted to supply the hydraulic oil discharged by the pump through the second switch valve to the second-speed gear clutch,
    wherein the first electromagnetic solenoid valve is connected to the first-speed gear shift actuator and the third switch valve through the first switch valve, while the second electromagnetic solenoid valve is connected to the third switch valve through the second switch valve.

2. The outboard motor according to claim 1, wherein the power transmission shaft comprises a main shaft and a propeller shaft, the transmission is interposed between the main shaft and the propeller shaft, the transmission comprising:
    a countershaft disposed in parallel with the main shaft;
    a main first-speed gear rotatably supported on the main shaft;
    a main second-speed gear irrotatably supported on the main shaft;
    a counter first-speed gear irrotatably supported on the countershaft and meshed with the main first-speed gear;
    a counter second-speed gear rotatably supported on the countershaft and meshed with the main second-speed gear;
    the first-speed gear clutch that is irrotatably but longitudinally movably supported on the main shaft and is adapted to couple with the main first-speed gear to engage the main first-speed gear on the main shaft when moved in one longitudinal direction;
    the second-speed gear clutch adapted to engage the counter second-speed gear on the countershaft when supplied with the hydraulic oil supplied by the pump; and
    the first-speed gear shift actuator that is adapted to move the first-speed gear clutch in the one longitudinal direction to couple the first-speed gear clutch with the first-speed gear.

3. An outboard motor adapted to be mounted on a stern of a hull of a boat and installed with an internal combustion engine to power a propeller through a power transmission shaft, comprising:
    a transmission having at least a first-speed gear and a second-speed gear each supported on the power transmission shaft, a first-speed gear clutch that is made of a mechanical dog clutch and is adapted to engage the first-speed gear on the power transmission shaft, a second-speed gear clutch that is made of a hydraulic clutch and is adapted to engage the second-speed gear on the power transmission shaft, and a first-speed gear shift actuator that is adapted to couple the first-speed gear clutch with the first-speed gear, a reverse gear supported on the power transmission shaft, a reverse gear clutch adapted to engage the reverse gear on the power transmission shaft, and a reverse shift actuator adapted to couple the reverse gear with the reverse gear clutch such that a power of the engine is transmitted to the propeller through the reverse gear when the reverse gear is engaged on the power transmission shaft, wherein a first speed is established when the first-speed gear is engaged on the power transmission shaft and a second speed is established when the second-speed gear is engaged on the power transmission shaft while the first speed has been established such that power of the engine is transmitted to the propeller through the established speed;
    a hydraulic oil pump that discharges a pressurized hydraulic oil when driven by the engine;
    a first electromagnetic solenoid valve provided at an oil passage connecting the pump and the first-speed gear shift actuator;
    a second electromagnetic solenoid valve provided at an oil passage connecting the pump and the reverse shift actuator;
    a first switch valve provided at the oil passage connecting the pump and the first-speed gear shift actuator and is adapted to supply the hydraulic oil discharged by the pump to the first-speed gear shift actuator;
    a second switch valve provided at the oil passage connecting the pump and the reverse shift actuator and is adapted to supply the hydraulic oil discharged by the pump to one oil chamber of the reverse shift actuator; and a third switch valve provided at an oil passage connecting the second switch valve and the reverse shift actuator and is adapted to supply the hydraulic oil discharged by the pump through the second switch valve to another oil chamber of the reverse shift actuator;

wherein the first electromagnetic solenoid valve is connected to the first-speed gear shift actuator through the first switch valve, while the second electromagnetic solenoid valve is connected to the reverse shift actuator and the third switch valve through the second switch valve.

4. The outboard motor according to claim 3, wherein the power transmission shaft comprises a main shaft and a propeller shaft, the transmission is interposed between the main shaft and the propeller shaft, the transmission comprising:

a countershaft disposed in parallel with the main shaft;

a main first-speed gear rotatably supported on the main shaft;

a main reverse gear irrotatably supported on the main shaft;

a counter first-speed gear irrotatably supported on the countershaft and meshed with the main first-speed gear;

a counter reverse gear rotatably supported on the countershaft and meshed with the main reverse gear;

the first-speed gear clutch that is irrotatably but longitudinally movably supported on the main shaft and is adapted to couple with the main first-speed gear to engage the main first-speed gear on the main shaft when moved in one longitudinal direction of the main shaft;

the reverse gear clutch that is irrotatably but longitudinally movably supported on the countershaft and is adapted to couple with the counter reverse gear to engage the counter revere gear on the countershaft when moved in one longitudinal direction of the countershaft;

the first-speed gear shift actuator that is adapted to move the first-speed gear clutch in the one longitudinal direction of the main shaft to couple the first-speed gear clutch with the first-speed gear; and a reverse shift actuator that is adapted to move the reverse gear clutch in the one longitudinal direction of the countershaft to couple with the reverse gear clutch with the reverse gear.

5. The outboard motor according to claim 3, wherein the third switch valve is provided with a hydraulic oil release passage that is adapted to release the hydraulic oil from the other oil chamber of the reserve shift actuator that acts against operation of the one oil chamber of the reserve shift actuator.

6. The outboard motor according to claim 5, wherein the hydraulic oil release passage is adapted to release the hydraulic oil from the other oil chamber of the reserve shift actuator when one of the first-speed gear and the second-speed gear is engaged on the power transmission shaft.

7. The outboard motor according to claim 5, wherein the hydraulic oil release passage comprises a borehole bored in a spool of the third switch valve and is communicated to the other oil chamber of the release shift actuator.

8. An apparatus for controlling operation of an outboard motor adapted to be mounted on a stern of a hull of a boat and installed with an internal combustion engine to power a propeller through a power transmission shaft, comprising:

a transmission having at least a first-speed gear and a second-speed gear each supported on the power transmission shaft, a first-speed gear clutch that is made of a mechanical dog clutch and is adapted to engage the first-speed gear on the power transmission shaft, a second-speed gear clutch that is made of a hydraulic clutch and is adapted to engage the second-speed gear on the power transmission shaft, and a first-speed gear shift actuator that is adapted to couple the first-speed gear clutch with the first-speed gear, wherein a first speed is established when the first-speed gear is engaged on the power transmission shaft and a second speed is established when the second-speed gear is engaged on the power transmission shaft while the first speed has been established such that power of the engine is transmitted to the propeller through the established speed;

an hydraulic oil pump that discharges a pressurized hydraulic oil when driven by the engine;

a first electromagnetic solenoid valve provided at an oil passage connecting the pump and the first-speed gear shift actuator;

a second electromagnetic solenoid valve provided at an oil passage connecting the pump and the second-speed gear clutch;

a shift/throttle lever position detector that detects whether a position of a shift/throttle lever manually operable by an operator is changed from neutral to forward; and a controller that controls operation of the first and second electromagnetic solenoid valves in such a manner that the first-speed gear clutch is coupled with the first-speed gear to establish the first speed and then the established first speed is shifted to the second speed, when the shift/throttle lever position is detected to be changed from the neutral to the forward.

9. The apparatus according to claim 8, further including:

an engine speed detector that detects whether a speed of the engine is equal to or smaller than a predetermined engine speed;

and the controller controls operation of the first and second electromagnetic solenoid valves in such a manner that the first-speed gear clutch is coupled with the first-speed gear to establish the first speed and then the established first speed is shifted to the second speed if the engine speed is detected to be equal to or smaller than the predetermined engine speed when the shift/throttle lever position is detected to be changed from the neutral to the forward.

10. The apparatus according to claim 8, wherein the transmission comprises:

a reverse gear supported on the power transmission shaft;

a reverse gear clutch adapted to engage the reverse gear on the power transmission shaft; and further including:

a second shift/throttle lever position detector that detects whether a position of a shift/throttle lever manually operable by an operator is changed from reverse to forward or from forward to reverse;

and the controller controls operation of the first and second electromagnetic solenoid valves in such a manner that, when the shift lever is detected to be changed from reverse to forward or from forward to reverse, once the first-speed gear clutch is decoupled from the first-speed gear and the reverse gear clutch is decoupled from the reverse gear and then the first-speed gear clutch is coupled with the first-speed gear or the reverse gear clutch is coupled with the reverse gear.

11. The apparatus according to claim 10, wherein the controller controls operation of the first and second electromagnetic solenoid valves in such a manner that, when the shift lever is detected to be changed from reverse to forward or from forward to reverse, once the first-speed gear clutch is kept decoupled from the first-speed gear for a predetermined time period and the reverse gear clutch is kept decoupled from the reverse gear for a predetermined time period and then the first-speed gear clutch is coupled with the first-speed gear or the reverse gear clutch is coupled with the reverse gear.

12. The apparatus according to claim 10, further including:

an engine speed detector that detects whether a speed of the engine is equal to or smaller than a predetermined engine speed; and the controller controls operation of the first and second electromagnetic solenoid valves in such a manner that, when the shift lever is detected to be changed from reverse to forward or from forward to reverse, once the first-speed gear clutch is decoupled from the first-speed gear and the reverse gear clutch is decoupled from the reverse gear and then the first-speed gear clutch is coupled with the first-speed gear or the reverse gear clutch is coupled with the reverse gear, when the engine speed is detected to be equal to or smaller than the predetermined engine speed.

* * * * *